(12) United States Patent
Hatanaka et al.

(10) Patent No.: US 11,391,966 B2
(45) Date of Patent: Jul. 19, 2022

(54) EYEGLASS LENS, METHOD FOR DESIGNING EYEGLASS LENS, AND METHOD FOR MANUFACTURING EYEGLASS LENS

(71) Applicant: HOYA LENS THAILAND LTD., Patumthani (TH)

(72) Inventors: Takashi Hatanaka, Tokyo (JP); Tomohiro Odaira, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 767 days.

(21) Appl. No.: 16/307,458

(22) PCT Filed: Jun. 6, 2017

(86) PCT No.: PCT/JP2017/020966
§ 371 (c)(1),
(2) Date: Dec. 5, 2018

(87) PCT Pub. No.: WO2017/213135
PCT Pub. Date: Dec. 14, 2017

(65) Prior Publication Data
US 2019/0302480 A1    Oct. 3, 2019

(30) Foreign Application Priority Data
Jun. 6, 2016  (JP) .............................. JP2016-112991

(51) Int. Cl.
*G02C 7/02* (2006.01)
*G02C 7/06* (2006.01)
(Continued)

(52) U.S. Cl.
CPC ............... *G02C 7/06* (2013.01); *G02C 7/024* (2013.01); *G02C 7/022* (2013.01)

(58) Field of Classification Search
CPC . G02C 7/061; G02C 7/06; G02C 7/02; B29D 11/00826
(Continued)

(56) References Cited

U.S. PATENT DOCUMENTS

| 8,425,034 | B2 | 4/2013 | Wietschorke |
| 2003/0123025 | A1 | 7/2003 | Shirayanagi |
| 2010/0271590 | A1 | 10/2010 | Kitani et al. |

FOREIGN PATENT DOCUMENTS

| EP | 2 407 815 A1 | 1/2012 |
| EP | 2 415 588 A1 | 2/2012 |

(Continued)

OTHER PUBLICATIONS

Sep. 5, 2017 International Search Report issued in International Patent Application No. PCT/JP2017/020966.
(Continued)

*Primary Examiner* — Dawayne Pinkney
(74) *Attorney, Agent, or Firm* — Oliff PLC

(57) ABSTRACT

In a spectacle lens added with prism thinning, a spherical refractive power of a first refractive portion is positive, and a prism base direction of a prism provided at a prism measurement reference point is set toward a second refractive portion side; a mean value of a difference of a mean curvature in a lens curved surface along a direction passing through a midpoint of a connecting line between two alignment reference marks and orthogonal to the connecting line with respect to a mean curvature in a lens curved surface along a direction of a lens without prism is smaller in a first-refractive-portion-side region from a fitting point than that in a second-refractive-portion-side region from the fitting point.

3 Claims, 20 Drawing Sheets

(51) Int. Cl.
  *G02C 5/00*     (2006.01)
  *G02C 7/00*     (2006.01)
(58) Field of Classification Search
  USPC .............. 351/159.42, 159.4, 159.41, 159.43,
                              351/159.06, 159.05, 159.01
  See application file for complete search history.

(56) References Cited

FOREIGN PATENT DOCUMENTS

| | | |
|---|---|---|
| JP | H05-341238 A | 12/1993 |
| JP | 2003-121801 A | 4/2003 |
| JP | 2016-090682 A | 5/2016 |
| WO | 2009/072528 A1 | 6/2009 |

OTHER PUBLICATIONS

Feb. 6, 2020 Partial Supplementary Search Report issued in European Patent Application No. 17810310.7.
Dec. 11, 2018 International Preliminary Report on Patentability issued in International Patent Application No. PCT/JP2017/020966.
May 27, 2020 Extended Search Report issued in European Patent Application No. 17810310.7.

EYEGLASS LENS, METHOD FOR DESIGNING EYEGLASS LENS, AND METHOD FOR MANUFACTURING EYEGLASS LENS

TECHNICAL FIELD

The present invention relates to a spectacle lens, a designing method for a spectacle lens, and a producing method for a spectacle lens.

BACKGROUND ART

As a spectacle lens, there is known a progressive power lens having a near portion, a distance portion, and a corridor. Since the progressive power lens has such a lens shape that a refractive power progressively increases from near the center of the lens to downward, an edge thickness of a lower end of the lens becomes thin, and conversely an edge thickness of an upper end of the lens becomes thick in a state where there is no prism at a prism measurement reference point located near the center of the lens, so that a center thickness of the lens tends to become thick. Therefore, even in a case without prism prescription, both edge thicknesses of the upper end and the lower end of the lens are made thin to reduce the center thickness of the lens, by providing a same amount of prism (in many cases, a prism base direction is 270°) corresponding to intensity of an addition power to the left and right lenses of the progressive power lens.

This prism that is provided to thin the lens is prism thinning. The prism thinning is a prism for reduction of a thickness in a progressive power lens having a vertical base direction (Japanese Industrial Standard JIS T7330: 2000). Since the prism provided to the lens by the prism thinning has a prism base direction in a vertical direction with respect to the left and right lenses, and an amount of the prism is same, there is no prism prescription effect of directing directions of visual lines of the left and right eyes to mutually different directions. Further, even for a lens of the prism prescription, upper and lower edge thicknesses or a center thickness of the lens may be reduced by performing prism thinning to add a prism in the vertical direction to the left and right eyes with a same amount of prism so as to minimize the edge thicknesses of the upper and lower ends of the lens with the prescribed prism.

Patent Literature 1 shows, as an example of prism thinning processing, a technique of performing cutting-processing on a rear surface of a semi-finished lens so as to add a same amount of prism having a vertical base direction to the left and right lenses, for the purpose of making the lens thinner and lighter.

CITATION LIST

Patent Literature

Patent Literature 1: JP H5-341238 A

SUMMARY OF INVENTION

Technical Problem

In a lens subjected to this prism thinning processing, since a deviation angle of the ray when a lens without prism is used as a reference does not become a constant angle from a prism measurement reference point to a lens periphery of the lens, a deviation of visual lines of both the left and right eyes, which arises in looking at a same object point, is different as compared with the lens without prism. As compared with a lens without prism, in binocular vision with a spectacle lens whose prism effect varies depending on a viewing direction in this way, there has been a problem that it is difficult to get used to spectacles when wearing spectacles with lenses subjected to prism thinning processing, since a different amount of prism effect from a case of viewing in a front direction is exerted in viewing in left and right directions and up and down directions with both eyes, although an amount of the prism effect is the same in the left and right lenses in viewing in the front direction.

Here, Patent Literature 1 is not intended to increase optical characteristics, but to add the prism having a vertical base direction to the left and right lenses by a same amount.

An object of one aspect of the present invention is to provide a spectacle lens, a designing method for a spectacle lens, and a producing method for a spectacle lens for eliminating a deviation of visual lines of both the left and right eyes in looking at a periphery of a lens added with the prism thinning, by causing, in the lens added with prism thinning processing, a deviation of visual lines of both the left and right eyes occurring in a case of looking at a same object point to be same as or close to that of a lens without prism, by causing a deviation angle of the ray to become a constant angle from a prism measurement reference point to a lens periphery of the lens, or by bringing the deviation angle close to a certain angle.

Solution to Problem

As one aspect of the present invention, a spectacle lens includes a first refractive portion having a first refractive power, and a second refractive portion having a second refractive power larger than the first refractive power, and the spectacle lens is added with prism thinning. In the spectacle lens, a spherical refractive power of the first refractive portion is positive; a prism base direction of a prism provided at a prism measurement reference point is set toward a second refractive portion side; as a spectacle lens, a spectacle lens that does not include prism thinning is defined as a reference lens; and in a lens curved surface along a direction passing through a midpoint of a connecting line between two alignment reference marks of the spectacle lens and orthogonal to the connecting line described above, a mean curvature in a direction in which a refractive power decreases from a fitting point in the lens curved surface along the orthogonal direction of the spectacle lens is larger than a mean curvature in the orthogonal direction of the reference lens.

As one aspect of the present invention, in the spectacle lens described above, when a difference between a mean curvature of the reference lens and a mean curvature of the spectacle lens is defined as a mean-curvature difference, a mean value of the mean-curvature difference in a second-refractive-portion-side region with the fitting point as a boundary in the orthogonal direction is larger than a mean value of the mean-curvature difference in a first-refractive-portion-side region.

As one aspect of the present invention, a spectacle lens includes a distance portion and a near portion, and the spectacle lens is added with prism thinning. In the spectacle lens, a spherical refractive power of the distance portion is negative or zero; a prism base direction of a prism provided at a prism measurement reference point is set toward the near-portion side; as a spectacle lens, a spectacle lens that does not include prism thinning is defined as a reference lens; and in a lens curved surface along a direction passing through a midpoint of a connecting line between two alignment reference marks of the spectacle lens and orthogonal to the connecting line described above, when a difference between a mean curvature of the reference lens and a mean curvature of the spectacle lens is defined as a mean-curvature difference, a value of the mean-curvature difference is 0.02 D or less at a distance-refractive-power measurement point.

As one aspect of the present invention, a spectacle lens includes a first refractive portion having a first refractive power, a second refractive portion having a second refractive power larger than the first refractive power, and the spectacle lens is added with prism thinning. In the spectacle lens, a spherical refractive power of the first refractive portion is positive; a prism base direction of a prism provided at a prism measurement reference point is set toward the first refractive portion side; as a spectacle lens, a spectacle lens that does not include prism thinning is defined as a reference lens; and in a lens curved surface along a direction passing through a midpoint of a connecting line between two alignment reference marks of the spectacle lens and orthogonal to the connecting line described above, a mean curvature at least in a direction in which a refractive power decreases from a fitting point in the lens curved surface along the above-mentioned direction of the spectacle lens is smaller than a mean curvature in an orthogonal direction of the reference lens.

As one aspect of the present invention, in the spectacle lens described above, when a difference between a mean curvature of the reference lens and a mean curvature of the spectacle lens is defined as a mean-curvature difference, a mean value of the mean-curvature difference in the second-refractive-portion-side region with the fitting point as a boundary in the orthogonal direction is smaller than a mean value of the mean-curvature difference in the first-refractive-portion-side region.

As one aspect of the present invention, a spectacle lens includes a distance portion, a near portion, and a corridor, and the spectacle lens is added with prism thinning. In the spectacle lens, a spherical refractive power of the distance portion is negative or zero; a prism base direction of a prism provided at a prism measurement reference point is set toward the distance portion side; as a spectacle lens, a spectacle lens that does not include prism thinning is defined as a reference lens; and in a lens curved surface along a direction passing through a midpoint of a connecting line between two alignment reference marks of the spectacle lens and orthogonal to the connecting line described above, when a difference between a mean curvature of the reference lens and a mean curvature of the spectacle lens is defined as a mean-curvature difference, a value of a difference with respect to a mean curvature is 0.02 D or more at a distance-power measurement position.

As one aspect of the present invention, a designing method for a spectacle lens is a method of designing a spectacle lens including a first refractive portion having a first refractive power, a second refractive portion having a second refractive power larger than the first refractive power, and a corridor provided between the first refractive portion and the second refractive portion, and the spectacle lens is added with prism thinning. The designing method for the spectacle lens includes a lens-surface-shape determination step. In a case where: a lens added with a prism corresponding to an amount of the prism thinning is defined as a prism thinning lens; a lens not added with a prism corresponding to an amount of the prism thinning is defined as a reference lens; in the reference lens, incident ray vectors in a case where a plurality of rays are incident on the reference lens such that a plurality of rays rotated by an angle corresponding to the prism are to exit and to be directed toward an eyeball rotation point are defined as a target ray group; and respective rays emitted from a plurality of object points are incident on an object-side optical surface of the prism thinning lens, and a ray group directed toward each line-of-sight direction of the prism thinning lens among a plurality of rays directed toward an eyeball rotation point among rays exiting from an eyeball-side optical surface of the prism thinning lens is defined as a prism ray group, the lens-surface-shape determination step determines a shape including a slope of the eyeball-side optical surface such that rays constituting the prism ray group become parallel to rays of the target ray group passing through a same position.

As one aspect of the present invention, in the designing method for the spectacle lens described above, the lens-surface-shape determination step includes: a prism-thinning-lens vector storing step of storing an incident ray vector of a ray incident on the object-side optical surface of the prism thinning lens and an exit ray vector exiting from the eyeball-side optical surface; a target-ray-group storing step of storing the target ray group; a pre-correction prismatic effect calculation step of calculating a prismatic effect of the prism thinning lens before correction from the incident ray vector and the exit ray vector stored in the prism-thinning-lens vector storing step; an ideal prismatic effect calculation step in which, from the incident ray vector stored in the prism-thinning-lens vector storing step and the target ray group stored in the target-ray-group storing step, each angle formed by a direction of an exit ray vector exiting from the reference lens and a direction of an exit ray vector exiting from the prism thinning lens becomes equal at any given point; a correction prism amount calculation step of calculating a correction prism amount in order to correct a slope of the object-side optical surface or the eyeball-side optical surface, based on a difference between a prismatic effect obtained in the pre-correction prismatic effect calculation step and a prismatic effect obtained in the ideal prismatic effect calculation step; and a correction step of correcting the object-side optical surface or the eyeball-side optical surface based on the correction prism amount obtained in the correction prism amount calculation step.

As one aspect of the present invention, in the designing method for the spectacle lens described above, after the correction step, the prism-thinning-lens vector storing step, the pre-correction prismatic effect calculation step, and the correction prism amount calculation step are performed; determination is made as to whether or not a difference of the prismatic effect is equal to or less than a target value or a predetermined number of corrections have been performed; and the correction step is terminated when a difference of the prismatic effect is equal to or less than a target value or a predetermined number of corrections have been performed.

As one aspect of the present invention, a producing method for a spectacle lens includes a spectacle lens designing step, and a processing step of processing a spectacle lens designed in the designing step for a spectacle lens. The spectacle lens designing step is a step of designing a spectacle lens including a first refractive portion having a first refractive power, a second refractive portion having a second refractive power larger than the first refractive power, and a corridor provided between the first refractive portion and the second refractive portion, and the spectacle lens is added with prism thinning. In the designing step, in a case where: a lens added with a prism corresponding to an amount of the prism thinning is defined as a prism thinning lens; a lens not added with a prism is defined as a reference lens; in the reference lens, incident ray vectors in a case where a plurality of rays are incident on the reference lens such that a plurality of rays rotated by an angle corresponding to the prism are to exit and to be directed toward an eyeball rotation point are defined as a target ray group; and respective rays emitted from a plurality of object points are incident on an object-side optical surface of the prism thinning lens, and a plurality of rays directed toward an eyeball rotation point among rays exiting from an eyeball-side optical surface of the prism thinning lens are defined as a prism ray group of each line-of-sight direction of the prism thinning lens, and in a case where: rays emitted from a plurality of object points are incident on an object-side optical surface of the reference lens, and a plurality of rays directed toward an eyeball rotation point among rays exiting from an eyeball-side optical surface of a prism prescription lens are defined as a target ray group; and rays emitted from a plurality of object points are incident on an object-side optical surface of the prism thinning lens, and a plurality of rays directed toward an eyeball rotation point among rays exiting from the eyeball-side optical surface of the prism thinning lens are defined as a prism ray group, an inclination of the object-side optical surface or the eyeball-side optical surface is determined such that a plurality of ray vectors passing through a same position as any given point among rays constituting the prism ray group become parallel to the target ray group.

DESCRIPTION OF EMBODIMENTS

[Spectacle Lens]

A spectacle lens according to an embodiment of the present invention will be described with reference to FIGS. 1, 2, 3A, 3B, 4 to 9, 10A, and 10B.

An outline of the spectacle lens will be described with reference to FIG. 1.

Figure 1:
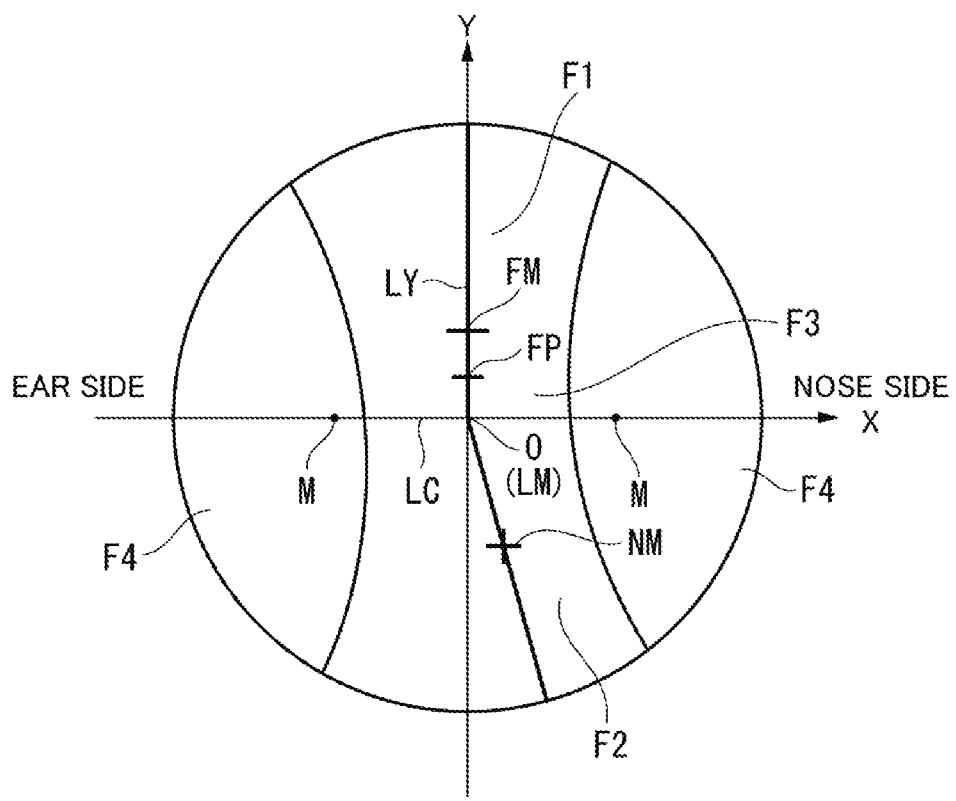
FIG. 1 is a view showing an outline of a spectacle lens according to one embodiment of the present invention.

FIG. 1 is a schematic view showing a shape of a progressive power lens (or a single vision aspherical lens).

In FIG. 1, in a case of a progressive power lens, there are individual alignment reference marks M symmetrical with respect to a prism measurement reference point O. A direction parallel to a direction of a connecting line LC between these alignment reference marks M is defined as an X direction. The prism measurement reference point O is on the line segment LC, and the prism measurement reference point O is a midpoint of the line segment LC. Whereas, a direction orthogonal to the line segment LC is defined as a Y direction. Further, in the present application, the prism measurement reference point O may coincide with an optical center.

The prism measurement reference point O is a point on a lens, and is defined by a manufacturer (maker) for measuring a prismatic effect of the lens. For example, in the progressive power lens, each prism measurement reference point O is arranged at the midpoint between the two alignment reference marks M specified by the manufacturer, and to be same as the optical center O in a single vision aspherical lens. The optical center O is also a lens geometric center O.

Whereas, in a case of a single vision aspherical lens, a direction passing through the prism measurement reference point O and orthogonal to a prism base direction is defined as a Y direction, and a direction passing through the prism measurement reference point O and parallel to the prism base direction is defined as an X direction.

A distance-power measurement position FM is a point on a lens, and is applied with a refractive power of a distance portion. A near-power measurement position NM is a point on a lens, and is applied with a refractive power of a near portion. A fitting point FP is a point on a lens, and is specified as a reference point for positioning the lens in front of the eye, by the manufacturer. Meanwhile, the positions FM and NM are used for the progressive power lens, while the fitting point FP is used for both lenses.

Then, a nose side indicates a position of the lens located on a nose side of the wearer in a spectacle wearing state, and an ear side indicates a position of the lens located on an ear side of the wearer in the spectacle wearing state.

Meanwhile, the lens of the present invention is a spectacle lens for prism prescription, which has been subjected to prescription including a prism for correcting fixation disparity, an oblique position, or the like, for example.

Then, this spectacle lens has a distance portion F1 as a first refractive portion, a near portion F2 as a second refractive portion, a corridor F3, and a side portion F4, and the spectacle lens is a lens added with prism thinning.

The prism thinning is added to an entire exit surface including the prism measurement reference point O specified by the manufacturer, and each lens periphery located above and below the prism measurement reference point O. The prism thinning is a prism having a vertical base direction and is to be added for reducing a thickness in a progressive power lens or a multifocal lens (Japanese Industrial Standard JIS T7330: 2000). A prism base direction of a prism provided at the prism measurement reference point O is either a first refractive portion side (upper side: Up direction) or a second refractive portion side (lower side: Down direction).

In this spectacle lens, the distance portion F1 includes a region having a first refractive power. The near portion F2 includes a region having a second refractive power larger than the first refractive power. The corridor F3 includes a region provided between the distance portion F1 and the near portion F2 and having a refractive power to be changed.

Further, this spectacle lens has an incident surface as an object-side optical surface and an exit surface as an eyeball-side optical surface.

A meridian LY is a virtual line assuming movement of a visual line from distance vision to near vision of the lens wearer. It can be seen that the meridian LY is a line passing through the Y direction from above the geometric center O, and is a line internally shifted to the nose side from below the geometric center O, which is not on the same line as the meridian LY.

The fitting point FP is at a predetermined position above the geometric center O on the meridian LY, for example, at a position of 2 mm from the geometric center O, while the distance-power measurement position FM is at a predetermined position from the fitting point FP, for example, at a position of 8 mm from the geometric center O.

The near-power measurement position NM is at a predetermined position below the geometric center O on the meridian LY, for example, at a position of 16 mm downward from the geometric center O.

The distance portion F1 is in an upper region from the distance-power measurement position FM in a wearing state, the near portion F2 is in a lower region from the near-power measurement position NM in the wearing state, and the corridor F3 is in a region between the distance-power measurement position FM and the near-power measurement position NM.

Examples 1 to 6 of the spectacle lens will be described with reference to FIGS. 2, 3A, 3B, and 4 to 9.

Examples 1 to 3 are embodiments in which the prism base direction is the same (Base Down), and only a spherical refractive power (S=+3, 0, −3) of the distance portion is different from each other.

Examples 4 to 6 are embodiments in which the prism base direction is the same (Base UP), and only a spherical refractive power (S=+3, 0, −3) of the distance portion is different from each other.

Example 1: Progressive Power Lens with Prism Base Direction of Downward (Base Down), Prismatic Power of 1.25 Δ (Prism Diopter), Addition ADD of 2.50 (D), and Spherical Refractive Power S of Distance Portion 1A of +3.0 (D)

Figure 2:
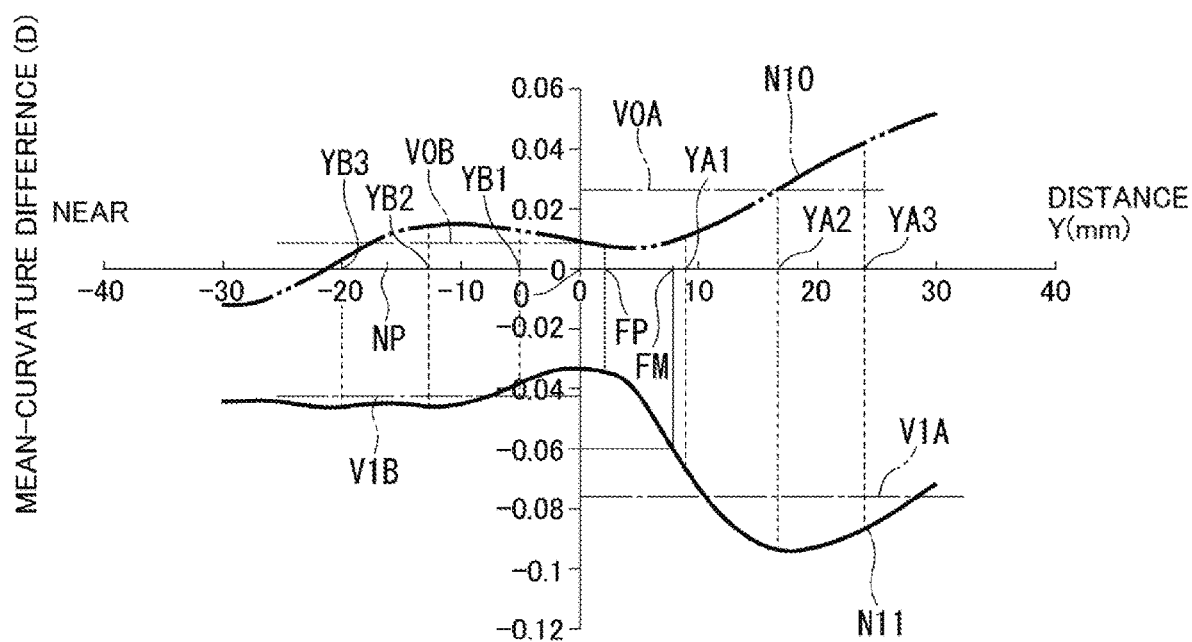
FIG. 2 is a graph showing an example of a spectacle lens according to one embodiment of the present invention, and showing a relationship between a perpendicular direction and a mean-curvature difference when a lens geometric center is O.

FIG. 2 is a graph showing an example of a spectacle lens according to one embodiment of the present invention, and showing a relationship between a perpendicular direction and a mean-curvature difference when a lens geometric center is O.

With reference to FIG. 2, a horizontal axis represents the Y direction and a vertical axis represents a mean-curvature difference. Further, coordinates (0, 0) indicate the geometric center O, and the fitting point FP, the distance-power measurement position FM, and the near-power measurement position NM are located on the Y axis. The distance portion is in a region on a right side of the distance-power measurement position FM, and the near portion is in a region on a left side of the near-power measurement position NM.

A mean curvature (unit D) is measured along the Y direction passing through the prism measurement reference point O. A measurement range for calculating the mean curvature was in a range of 60 mm with the prism measurement reference point O as a midpoint.

(Regarding Arrangement of Measurement Points)

Arrangement of the measurement points for calculating the mean curvature is arrangement of 1 mm at equal intervals, and the mean curvature is a surface refractive power calculated by the following calculation formula at each position.

Calculation formula: mean curvature at each position×(refractive index of lens−1)×1000    (Expression 1)

(Measuring Method)

Measurement of the mean curvature was carried out by contacting the eyeball-side optical surface with TALYSURF (manufactured by TAYLOR HOBSON).

Meanwhile, for the measurement position, when a reference position, for example, two alignment reference marks can be recognized in the progressive power lens, a position passing through the alignment reference marks may be used as the measurement position. Further, the measurement range is preferably in a range of 50 mm to 60 mm. Then, the number of measuring points for calculating the mean curvature can be selected in a range of about 10 to 10,000 points, but it is preferable to be 100 points or more.

As a measurement device, a trade name UA3P (manufactured by Matsushita Electric Industrial Co., Ltd.), a trade name Ultra-High Accuracy CNC Three Dimensional Measuring Machine LEGEX 9106 (Mitutoyo Corporation), a product name PMD 100 (manufactured by schneider), a product name Dual LensMapper (Automation & Robotqics) and the like are suitable. In the measurement method according to the present embodiment, not only the above-described measurement method, but also measurement as described below may be performed. For example, after measuring the entire lens surface, the measurement result may be analyzed, and a straight line passing through the prism measurement reference point O and having the same direction as the prism base direction may be specified.

Figure 3A:
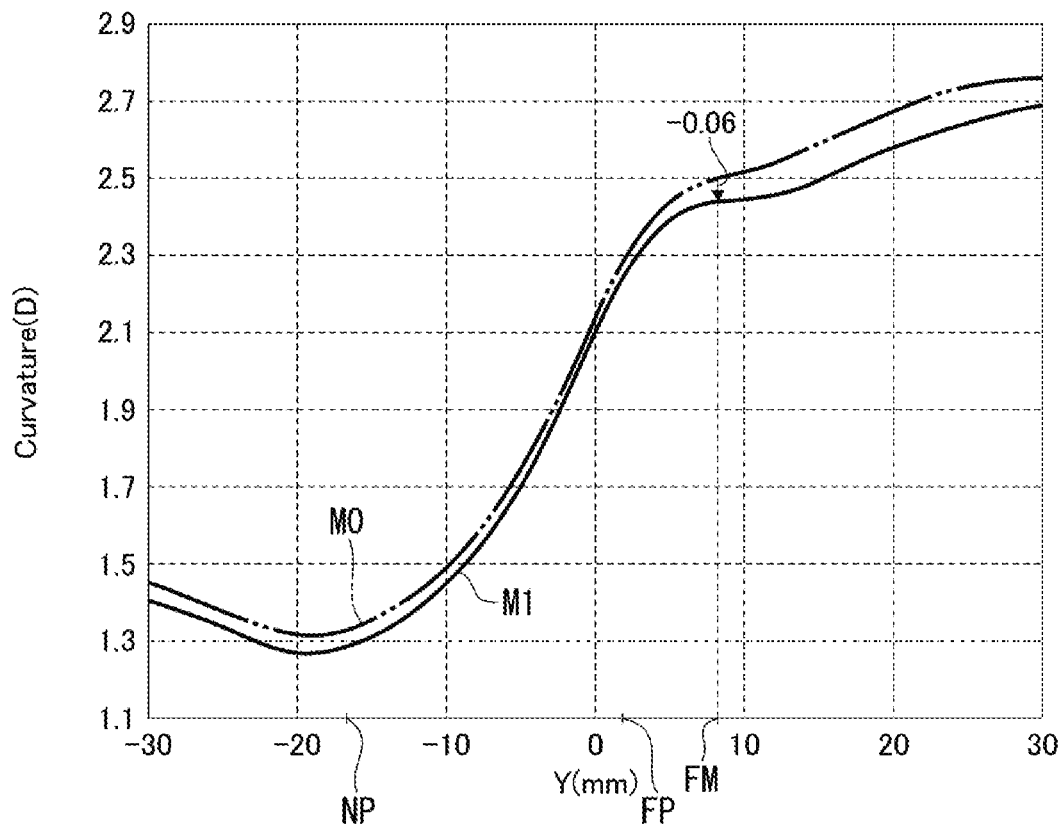
FIG. 3A is a graph for explaining a method of obtaining a mean-curvature difference, and showing a relationship between a perpendicular direction and a mean curvature.
Figure 3B:
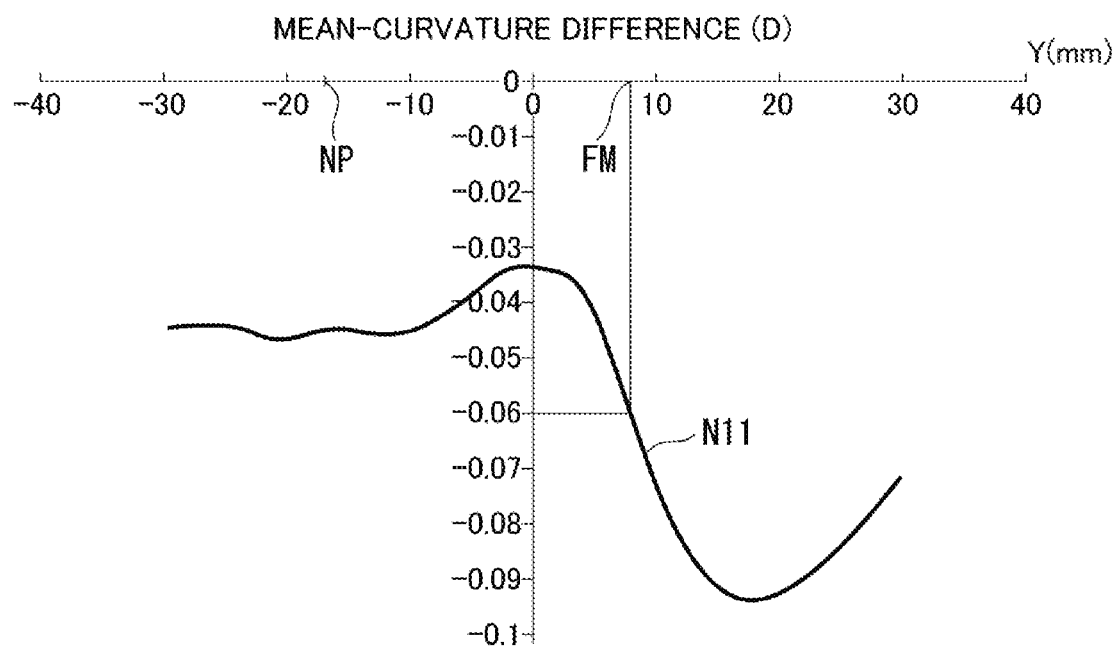
FIG. 3B is a graph for explaining a method of obtaining a mean-curvature difference, and showing a mean-curvature difference of a lens added with prism thinning with respect to a lens without prism.

FIGS. 3A and 3B are graphs for explaining a method of obtaining a mean-curvature difference, in which FIG. 3A is a graph showing a relationship between a perpendicular direction and a mean curvature, and FIG. 3B is a graph showing a mean-curvature difference of a lens added with prism thinning with respect to a lens without prism.

In FIG. 3A, a mean curvature of a lens without prism is shown as M1. The mean curvature M1 takes a lowest value (1.3 (D)) at a position of the near portion (Y=−18 mm), is 2.1 (D) at the geometric center O, and is 2.44 (D) at the distance-power measurement position FM, and the numerical value gradually increases from the distance-power measurement position FM toward the lens peripheral direction.

A mean curvature of a spectacle lens added with prism thinning in Example 1 is shown as M0. The mean curvature M0 is a curve approximate to the mean curvature M1, and is 2.5 (D) at the distance-power measurement position FM.

FIG. 3B shows a difference (M1−M0) of the mean curvature M1 from the mean curvature M0 in the perpendicular direction, as a graph N11.

The value in the graph N11 gently changes in a range of −0.05 (D) to −0.04 (D) from a position of −30 mm to a position of −10 mm in the Y direction, gently rises from the position of −10 mm to a position of 0 mm, continues to descend to −0.09 (D) from the position of 0 mm to a position of 18 mm, and rises to −0.07 (D) from the position of 18 mm to a position of 30 mm. Among these, the value is about −0.035 (D) at the position of 0 mm, −0.035 (D) at the fitting point FP, and −0.06 (D) at the distance-power measurement position FM.

Referring again to FIG. 2, in addition to graph N11, a graph N10 in Comparative Example 1 is shown. Comparative Example 1 and Comparative Examples 2 to 6 to be described later are the same as Example 1 and Examples 2 to 6 to be described later, except that a surface is inclined such that a desired prism thinning amount is added at the prism measurement reference point O (geometric center O).

Furthermore, a mean-curvature difference of the mean curvature along the Y direction with respect to a lens without prism in Comparative Example 1 is shown as the graph N10.

The value in the N10 gently changes in a range of 0 to 0.015 (D) from a position of −20 mm to a position of −10 mmm in the Y direction, gradually descends until reaching 0.01 (D) from the position of −10 mm to a position of 0 mm, and rises to 0.05 (D) from the position of 0 mm to a position of 30 mm.

In Example 1 shown by the graph N11, the mean-curvature difference along the Y direction of the lens without prism with respect to the mean curvature in the lens curved surface is negative from the distance portion to the near portion. In particular, the mean curvature in a direction in which the refractive power decreases from the fitting point FP is smaller than the mean curvature in the lens curved surface along the Y direction of the lens without prism.

Here, in Example 1, when V1A is a mean value of mean-curvature differences at positions YA1, YA2, and YA3 separated from the fitting point FP by a predetermined dimension in a region from the fitting point FP toward a lens peripheral portion of the distance portion (a first-refractive-portion-side region), and V1B is a mean value of mean-curvature differences at positions YB1, YB2, and YB3 separated from the fitting point FP by a predetermined dimension in a region from the fitting point FP toward a lens peripheral portion of the near portion (a second-refractive-portion-side region), the mean value V1A (−0.078 (D) from FIGS. 3A and 3B) is smaller than the mean value V1B (−0.042 (D) from FIGS. 3A and 3B).

On the other hand, in Comparative Example 1, when a mean value of the mean-curvature differences of the positions YA1, YA2, and YA3 in the first-refractive-portion-side region from the fitting point FP is V0A, and a mean value of the mean-curvature differences of the positions YB1, YB2, and YB3 in the second-refractive-portion-side region from the fitting point FP is V0B, the mean value V0A (0.025 (D) from FIG. 2) is larger than the mean value V0B (0.012 (D) from FIG. 2).

Example 2: Progressive Power Lens with Prism Base Direction of Lower Side (Base Down), Prismatic Power of 1.25 Δ, Addition ADD of 2.50 (D), and Spherical Refractive Power S of 0 D The Example 2 is a similar embodiment except that the spherical refractive power of the distance portion is changed to S=0 (D), as compared with Example 1.

Figure 4:
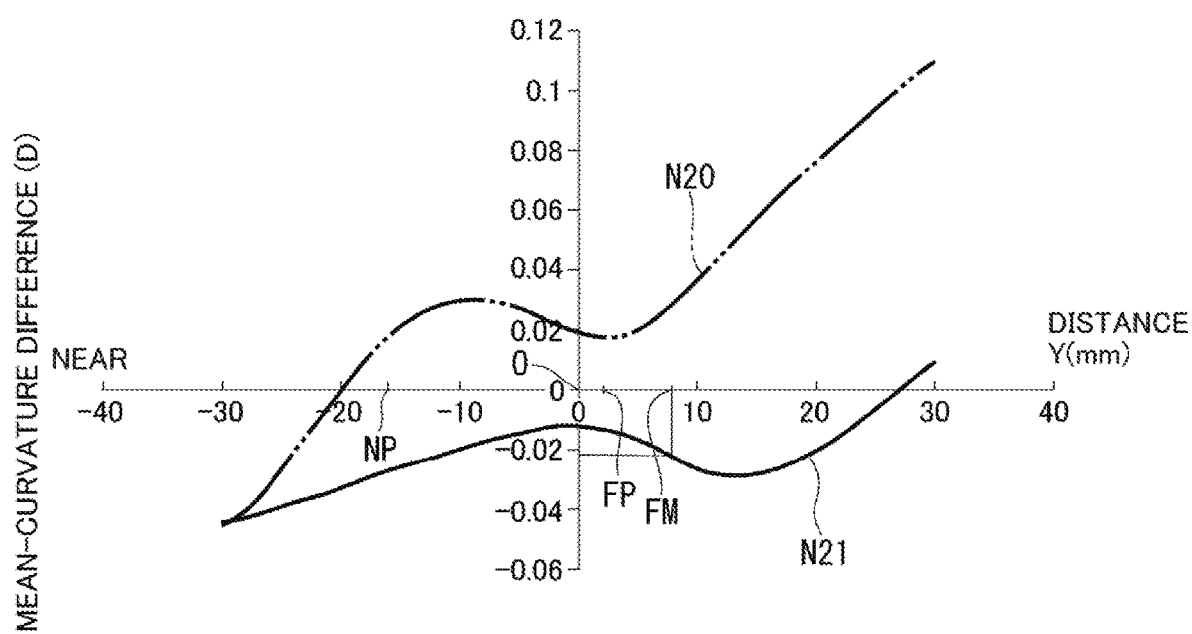
FIG. 4 is a graph showing another example of a spectacle lens, and showing a relationship between a perpendicular direction and a mean-curvature difference when a lens geometric center is O.

FIG. 4 is a graph showing another example of a spectacle lens, and showing a relationship between a perpendicular direction and a mean-curvature difference when a lens geometric center is O.

FIG. 4 shows a mean-curvature difference of a mean curvature along the Y direction with respect to a lens without prism in Example 2, as a graph N21.

The graph N21 indicates that the value at the geometric center O is −0.01 (D), and the value at the distance-power measurement position FM is smaller than −0.02 (D).

A mean-curvature difference of a mean curvature along the Y direction with respect to a lens without prism in Comparative Example 2 is shown as a graph N20.

In the graph N20, the value is 0 (D) at a position of (Y=−20 mm), and becomes positive from this position toward the first-refractive-portion-side region. The numerical value at the geometric center O is 0.02 (D), and the numerical value at the distance-power measurement position FM is slightly larger than 0.02 (D).

Example 3: Progressive Power Lens with Prism Base Direction of Lower Side (Base Down), Prismatic Power of 1.25 Δ, Addition ADD of 2.50 (D), and Spherical Refractive Power S of −3.0 (D)

The Example 3 is a similar embodiment except that the spherical refractive power of the distance portion is changed to S=−3 (D), as compared with Example 1.

Figure 5:
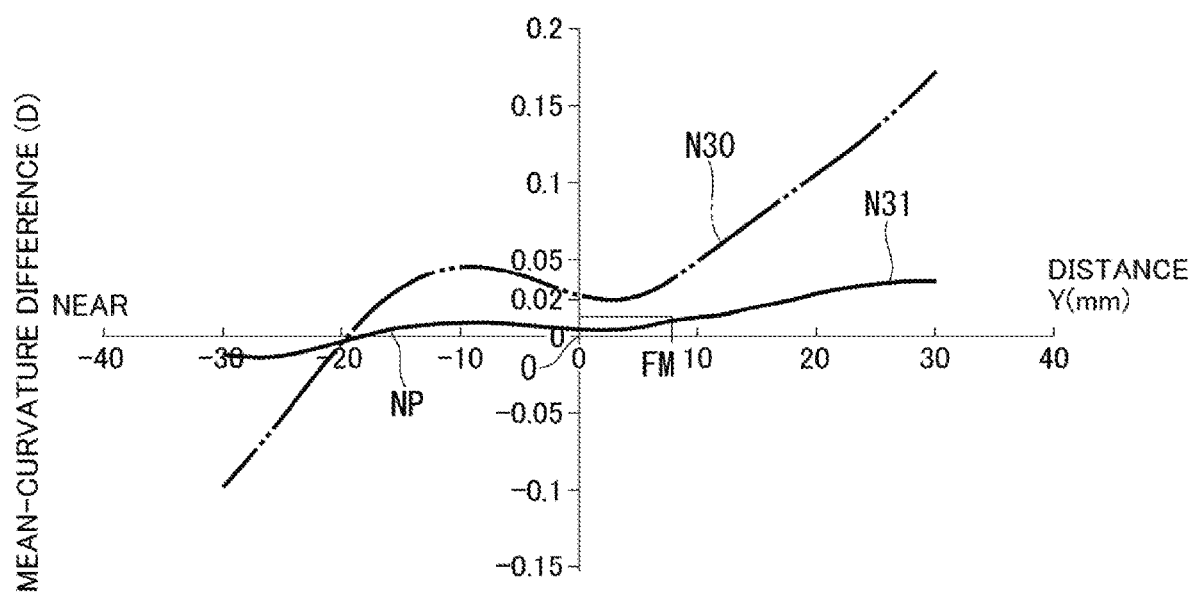
FIG. 5 is a graph showing another example of a spectacle lens, and showing a relationship between a perpendicular direction and a mean-curvature difference when a lens geometric center is O.

FIG. 5 is a graph showing another example of a spectacle lens, and showing a relationship between a perpendicular direction and a mean-curvature difference when a lens geometric center is O.

FIG. 5 shows a mean-curvature difference of a mean curvature along the Y direction with respect to a lens without prism in Example 3, as a graph N31.

The graph N31 indicates that the value is positive from a position of (Y=−20 mm) to the first-refractive-portion-side region. The values at the geometric center O and the distance-power measurement position FM are smaller than 0.01 (D).

A mean-curvature difference of a mean curvature along the Y direction with respect to a lens without prism in Comparative Example 3 is a graph N30.

In the graph N30, the value is 0 (D) at a position of (Y=−20 mm), and becomes positive from this position toward the first refractive portion region. The numerical value at the geometric center O is 0.02 (D), and the numerical value at the distance-power measurement position FM is 0.04 (D).

Example 4: Progressive Power Lens with Prism Base Direction of Upper Side (Base Up), Prismatic Power of 1.25 Δ, Addition ADD of 2.50 (D), and Spherical Refractive Power S of +3.0 (D)

Example 4 is a similar embodiment except that the prism base direction is changed to an upper side (UP direction), as compared with Example 1.

Figure 6:
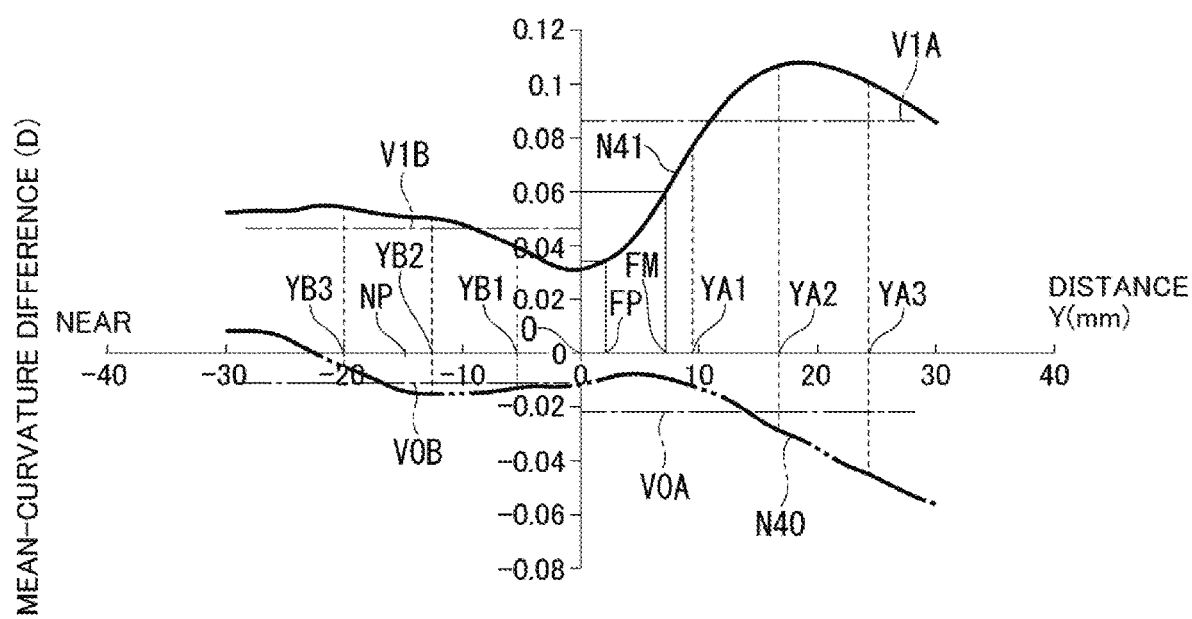
FIG. 6 is a graph showing another example of a spectacle lens, and showing a relationship between a perpendicular direction and a mean-curvature difference when a lens geometric center is O.

FIG. 6 is a graph showing another example of a spectacle lens, and showing a relationship between a perpendicular direction and a mean-curvature difference when a lens geometric center is O.

FIG. 6 shows a mean-curvature difference of a mean curvature along the Y direction with respect to a lens without prism in Example 4, as a graph N41.

The graph N41 is a curve in which the positive and negative of the graph N11 in Example 1 are reversed. That is, the value in the graph N41 gently changes in a range of 0.04 (D) to 0.05 (D) from a position of −30 mm to a position of −10 mmm, gradually descends from the position of −10 mm to a position of 0 mm, continues to rise to 0.11 (D) from the position of 0 mm to a position of 18 mm, and descends to 0.08 (D) from the position of 18 mm to a position of 30 mm. Among these, the value is 0.035 (D) at the position of 0 mm, 0.036 (D) at the fitting point FP, and 0.06 (D) at the distance-power measurement position FM.

A mean-curvature difference of a mean curvature along the Y direction with respect to a lens without prism in Comparative Example 4 is shown by a graph N40.

The value in the N40 gently changes in a range of −0.015 (D) to −0.01 (D) from a position of −20 mm to a position of −10 mmm, gradually rises until reaching −0.005 (D) from the position of −10 mm to a position of 0 mm, and descends to −0.05 (D) from the position of 0 mm to a position of 30 mm. Among these, the value is −0.01 (D) at the position of 0 mm, −0.009 (D) at the fitting point FP, and −0.01 (D) at the distance-power measurement position FM.

In Example 4, the mean-curvature difference is positive from the distance portion to the near portion. In particular, the mean curvature in a direction in which the refractive power decreases from the fitting point FP is larger than the mean curvature in the lens curved surface along the Y direction of the lens without prism.

In Example 4, when a mean value of mean-curvature differences at positions YA1, YA2, and YA3 of the distance portion is V1A, and a mean value of mean-curvature differences at positions YB1, YB2, and YB3 of the near portion is V1B, the mean value V1A is larger than the mean value V1B.

Whereas, in Comparative Example 4, when a mean value of mean-curvature differences at positions YA1, YA2, and YA3 is V0A, and a mean value of mean-curvature differences at positions YB1, YB2, and YB3 is V0B, the mean value V0A is smaller than the mean value V0B.

Example 5: Progressive Power Lens with Prism Base Direction of an Upper Side (Base Up), Prismatic Power of 1.25 Δ, Addition ADD of 2.50 (D), and Spherical Refractive Power S of 0 (D)

Example 5 is a similar embodiment except that the prism base direction is changed to an upper side (UP direction), as compared with Example 2.

Figure 7:
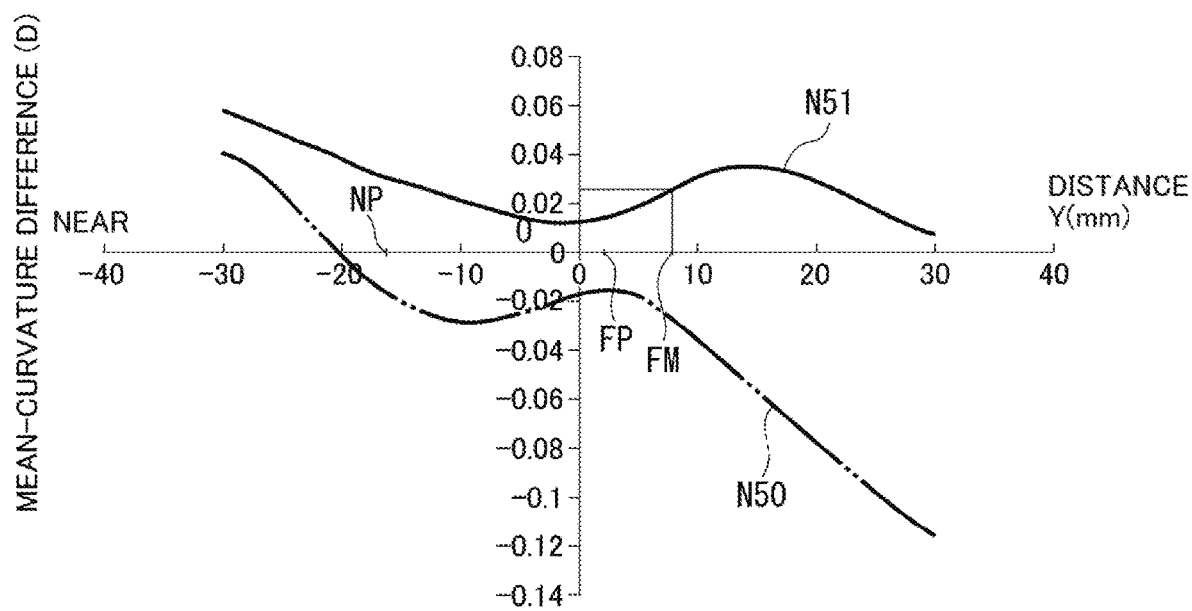
FIG. 7 is a graph showing another example of a spectacle lens, and showing a relationship between a perpendicular direction and a mean-curvature difference when a lens geometric center is O.

FIG. 7 is a graph showing another example of a spectacle lens, and showing a relationship between a perpendicular direction and a mean-curvature difference when a lens geometric center is O.

In FIG. 7, a mean-curvature difference of a mean curvature along the Y direction with respect to a lens without prism in Example 5 is a graph N51.

In the graph N51, the value at the geometric center O is slightly larger than 0.01 (D), and the value at the distance-power measurement position FM is larger than 0.02 (D).

Comparative Example 5 is the same as Example 5 except that prism thinning is added only at a prism measurement point.

A mean-curvature difference of a mean curvature along the Y direction with respect to a lens without prism in Comparative Example 5 is a graph N50.

In the graph N50, the value is 0 at a position of −20 mm, and becomes negative from this position toward the first-refractive-portion-side region (distance portion). The numerical value at the geometric center O is −0.02 (D), and the numerical value at the distance-power measurement position FM is slightly smaller than −0.02 (D).

Example 6: Progressive Power Lens with Prism Base Direction of Upper Side (Base Up Direction), Prismatic Power of 1.25 Δ, Addition ADD of 2.50 (D), and Spherical Refractive Power S of −3.0 (D)

Example 6 is a similar embodiment except that the prism base direction is changed to an upper side (UP direction), as compared with Example 3.

Figure 8:
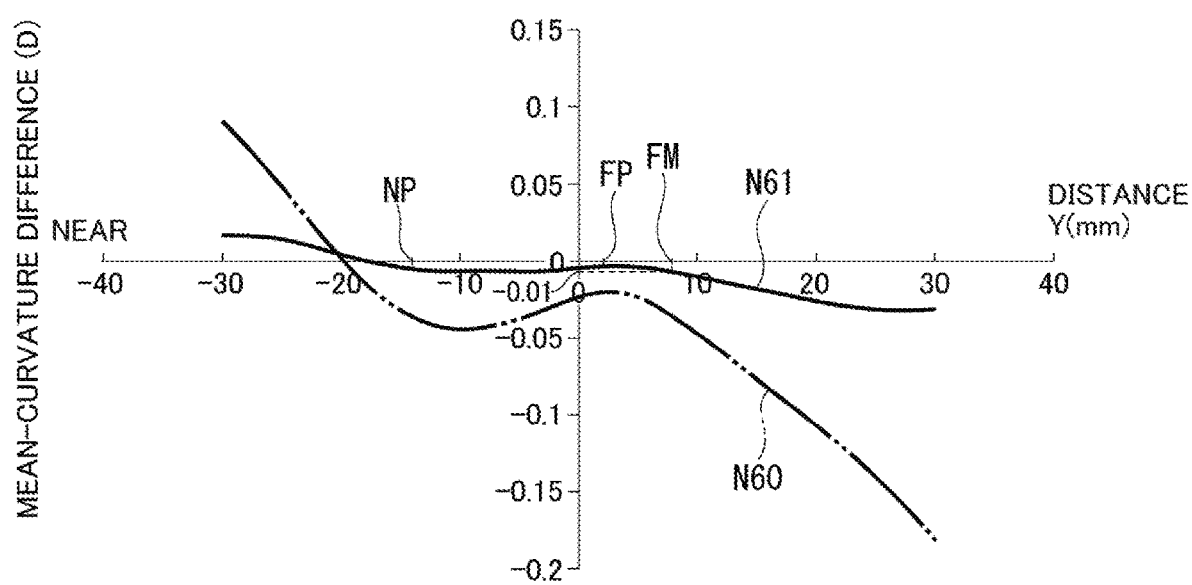
FIG. 8 is a graph showing another example of a spectacle lens, and showing a relationship between a perpendicular direction and a mean-curvature difference when a lens geometric center is O.

FIG. 8 is a graph showing another example of a spectacle lens, and showing a relationship between a perpendicular direction and a mean-curvature difference when a lens geometric center is O.

FIG. 8 shows a mean-curvature difference of a mean curvature along the Y direction with respect to a lens without prism in Example 6, as a graph N61.

In the graph N61, the value is negative from −20 mm to the first refractive portion region (distance portion). The mean-curvature difference between the geometric center O and the distance-power measurement position FM is larger than −0.01 (D).

A mean-curvature difference of a mean curvature along the Y direction with respect to a lens without prism in Comparative Example 6 is a graph N60.

In the graph N60, the value is 0 (D) at a position of −20 mm, and becomes negative from this position toward the first refractive portion region (distance portion). The numerical value at the geometric center O is −0.02 (D), and the numerical value at the distance-power measurement position FM is −0.04 (D).

Meanwhile, a mean value of a mean-curvature difference in the present embodiment was measured as follows.

In the spectacle lens of the present invention, assuming that the fitting point FP is 4 mm above the prism measurement reference point O in each region, a mean-curvature difference was measured at intervals of 5 mm (about 5 to 7 points) in a range of ±30 mm from the fitting point FP in the direction passing through a midpoint of a connecting line between the two alignment reference marks and orthogonal to the connecting line, and a mean of the measured values was calculated.

(Down Prism: When Prism Base Direction is Lower Side)

In the present invention (e.g., LSV manufactured by HOYA Corporation), the first refractive portion region is −0.075 (D), and the second refractive portion region is −0.042 (D) (the first<the second), while in the Comparative Example (e.g., LSV manufactured by HOYA Corporation), a mean of the mean-curvature difference of the first refractive portion region is 0.027 (D), and a mean of the mean-curvature difference of the second refractive portion region is 0.006 (D).

(Up Prism: When Prism Base Direction is Upper Side)

In the present invention (e.g., LSV manufactured by HOYA Corporation), a mean of the mean-curvature difference of the first refractive portion region is 0.086 (D), and a mean of the mean-curvature difference of the second refractive portion region is 0.046 (D) (the first refractive portion region>the second refractive portion region).

In Comparative Example (e.g., LSV manufactured by HOYA Corporation), a mean of the mean-curvature difference of the first refractive portion region is −0.029 (D), and a mean of the mean-curvature difference of the second refractive portion region is −0.008 (D) (the first refractive portion region<the second refractive portion region).

[Spectacle Lens Designing Apparatus]

One embodiment of a spectacle lens designing apparatus and a designing method for a spectacle lens according to the present invention will be described with reference to the drawings.

Figure 9:
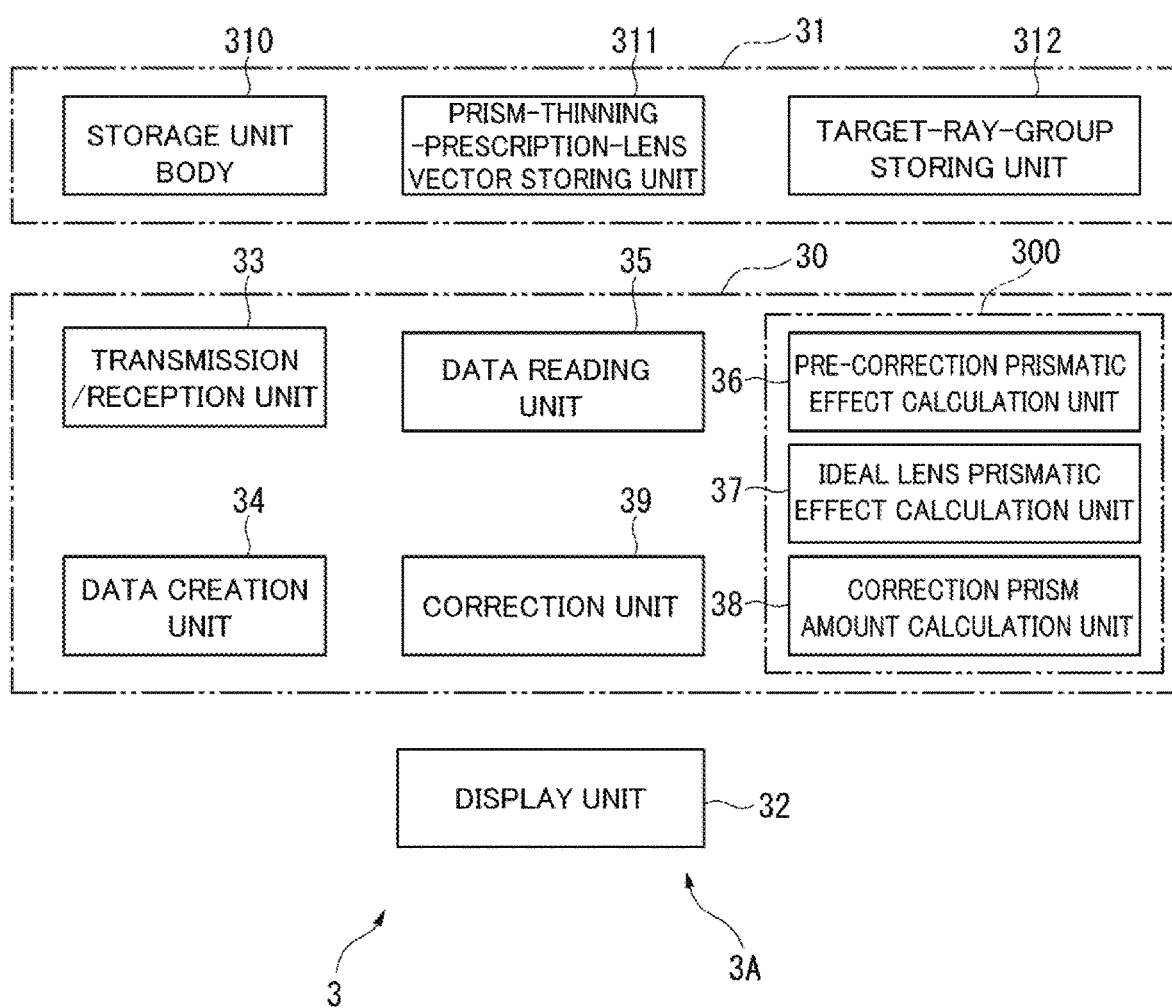
FIG. 9 is a block diagram showing a spectacle lens designing apparatus according to one embodiment of the present invention.

FIG. 9 is a block diagram showing a spectacle lens designing apparatus according to one embodiment of the present invention.

A spectacle lens designing apparatus 3 is an apparatus to design a spectacle lens in which a ray incident on an incident surface is to exit from an exit surface toward an eyeball rotation point. The designing apparatus 3 includes a lens-surface-shape determination unit 3A that determines a slope (hereinafter also referred to as inclination) of an optical surface of the exit surface. Then, the lens-surface-shape determination unit 3A includes a control unit 30, a storage unit 31, and a display unit 32.

The control unit 30 includes an arithmetic circuit such as a CPU, and a memory circuit such as a RAM. Then, the control unit 30 develops a program stored in the storage unit 31 in the RAM and executes various processes in cooperation with the program developed in the RAM.

The control unit 30 executes functions of a transmission/reception unit 33, a data creation unit 34, a data reading unit 35, a pre-correction prismatic effect calculation unit 36, an ideal prismatic effect calculation unit 37, a correction prism amount calculation unit 38, and a correction unit 39.

The transmission/reception unit 33 also functions as an optometric information acquisition unit that acquires optometric information of a wearer from an optometric apparatus (not shown). Further, the transmission/reception unit 33 receives information necessary for designing the spectacle lens from a computer (not shown), and transmits design data and the like to other computers.

Here, the optometric information is the spherical refractive power S of the spectacle lens, the first refractive power applied at the first refractive portion of the progressive power lens, the second refractive power applied at the second refractive portion, a corridor length, and other information. As one aspect, this other information includes information on prism thinning, and includes information on a prism amount, a prism base direction (upper side (Up direction), lower side (Down direction)), and a frame.

The data creation unit 34 calls stored information of the storage unit 31. Then, the data creation unit 34 creates data of incident ray vectors L11A, L12A, and L13A incident on an incident surface LI of a reference lens BL, and exit ray vectors L11B, L12B, and L13B exiting from an exit surface LO of the reference lens BL. Then, the data creation unit 34 creates data of incident ray vectors L21A, L22A, and L23A incident on an incident surface LI of a prism thinning lens CL, and exit ray vectors L21B, L22B, and L23B (See FIG. 10) exiting from an exit surface LO of the prism thinning lens CL, and other data. Here, the reference lens BL refers to a lens that has prescription values other than prism thinning all the same, and is not added with a prism. Whereas, the prism thinning lens CL refers to a lens added with a prism including prism thinning.

Then, in the data creation unit 34 shown in FIG. 9, a prism distribution, a reference prism distribution, and a difference prism distribution to be described later are created by a ray tracing method or other methods. The data created by the data creation unit 34 is once stored in the storage unit 31.

The data reading unit 35 reads various data created by the data creation unit 34, from the storage unit 31.

Then, a calculation unit 300 includes the pre-correction prismatic effect calculation unit 36, the ideal prismatic effect calculation unit 37, and the correction prism amount calculation unit 38.

First, the pre-correction prismatic effect calculation unit 36 calculates a prismatic effect of the reference lens with no prism prescription, based on an incident ray vector and an exit ray vector stored in a prism-thinning-lens vector storing unit 311 to be described later.

Then, the ideal prismatic effect calculation unit 37 calculates a prismatic effect for obtaining an ideal exit ray that can be obtained when a ray is incident on the prism thinning lens, based on the incident ray vector stored in the prism-thinning-lens vector storing unit 311 and the exit ray vector stored in a target-ray-group storing unit 312 to be described later.

Further, the correction prism amount calculation unit 38 calculates a correction prism amount for correcting a slope of the exit surface, based on a difference between the prismatic effect obtained by the pre-correction prismatic effect calculation unit 36 and the prismatic effect obtained by the ideal prismatic effect calculation unit 37.

Then, the correction unit 39 corrects the slope of the exit surface based on the correction prism amount obtained by the correction prism amount calculation unit 38.

The storage unit 31 includes a storage unit body 310, the prism-thinning-lens vector storing unit 311, and the target-ray-group storing unit 312.

The storage unit body 310 stores various programs for controlling an operation of the spectacle lens designing apparatus 3, and various kinds of information. The various kinds of information include optometric information for each wearer acquired by the transmission/reception unit 33, a material of the spectacle lens, a refractive index, and other design information necessary for designing.

Here, in addition to FIG. 9, description will be made with further reference to FIGS. 10A and 10B to be described later.

The prism-thinning-lens vector storing unit 311 stores the incident ray vectors L21A, L22A, and L23A (see FIG. 10B) of rays incident on an incident surface LI of the prism thinning lens CL, and the exit ray vectors L21B, L22B, and L23B (see FIG. 10B) exiting from an exit surface LO.

The target-ray-group storing unit 312 stores, in the storage unit 31, the incident ray vectors L11A, L12A, and L13A (see FIG. 10A) rotated by an angle γ corresponding to a prism amount of prism thinning and incident on the incident surface LI, and the exit ray vectors L11B, L12B, and L13B (see FIG. 10A) exiting from the exit surface LO. Here, the incident ray vectors L11A, L12A, and L13A are the target ray group.

A designing method for a spectacle lens using the designing apparatus 3 having the above-described configuration will be described.

A concept that is a prerequisite for explaining the designing method for a spectacle lens will be described with reference to FIGS. 10A and 10B.

Figure 10A:
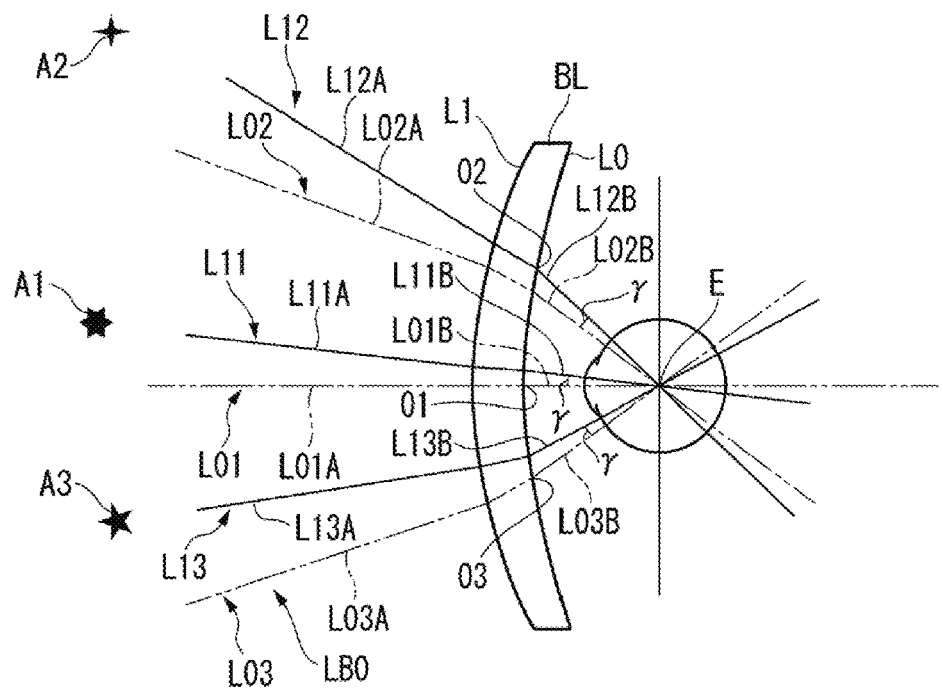
FIG. 10A is a schematic view for explaining a principle of a lens designing method.
Figure 10B:
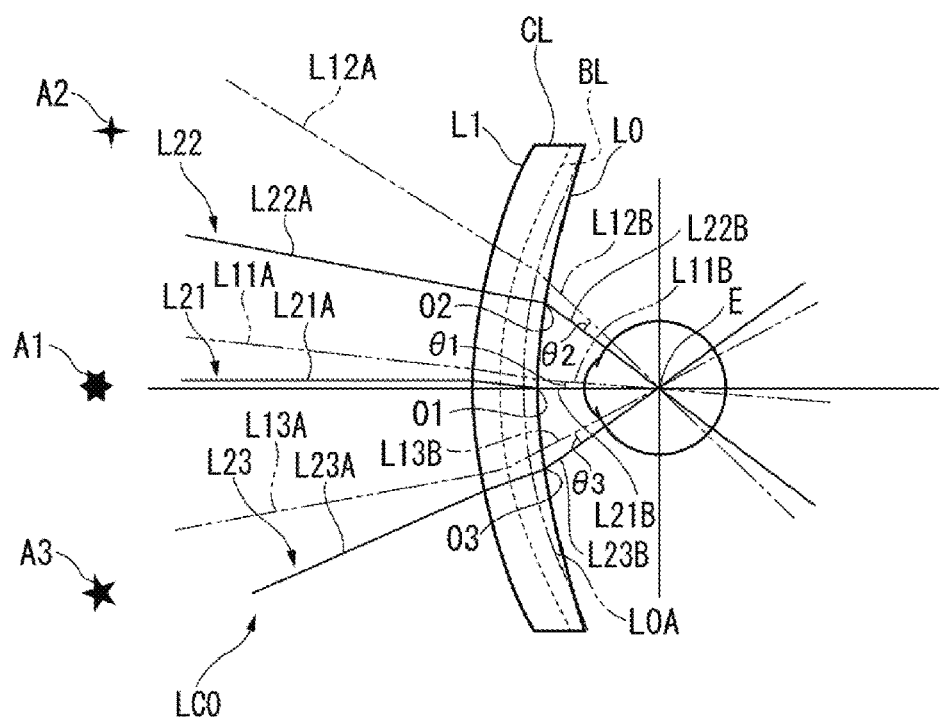
FIG. 10B is a schematic view for explaining a principle of a lens designing method.

FIGS. 10A and 10B are schematic views for explaining a principle of the lens designing method.

FIG. 10A shows a reference lens BL.

A simulation is performed in which rays emitted from a plurality of object points A1, A2, and A3 are to exit from the exit surface LO through the incident surface LI of the reference lens BL.

Among the plurality of rays, ray vectors L01, L02, and L03 exiting from any given point on the exit surface LO of the reference lens BL and individually directed toward an eyeball rotation point E are defined as a reference ray group LB0 of each line-of-sight direction of the reference lens BL.

In the present invention, it is defined that the object points A1, A2, and A3 are at an infinite distance or at a finite distance. Here, the finite distance is a distance of a degree that can be identified as the infinite distance.

The ray vector L01 includes an incident ray vector L01A emitted from the object point A1 and incident on a lens geometric center O of the incident surface LI, a vector directed toward the prism measurement reference point O1 of the exit surface LO from an incident position of the incident ray vector L01A, and an exit ray vector L01B directed toward an eyeball rotation point E from a prism measurement reference point O1 of the exit surface LO.

Similarly, the ray vector L02 includes an incident ray vector L02A emitted from the object point A2 and incident on the incident surface LI, a vector directed toward any given lens peripheral portion O2 of the exit surface LO from an incident position of the incident ray vector L02A, and an exit ray vector L02B directed toward an eyeball rotation point E from the lens peripheral portion O2 of the exit surface LO.

Similarly, the ray vector L03 includes an incident ray vector L03A emitted from the object point A3 and incident on the incident surface LI, a vector directed toward any given lens peripheral portion O3 of the exit surface LO from an incident position of the incident ray vector L03A, and an exit ray vector L03B directed toward an eyeball rotation point E from the lens peripheral portion O3 of the exit surface LO.

Here, L11, L12, and L13 indicate a plurality of ray vectors respectively obtained by rotating the ray vectors L01, L02, and L03 by an angle γ corresponding to a prism thinning amount applied at the prism measurement reference point O1. In the ray vectors L11, L12, and L13, the incident ray vectors are indicated by L11A, L12A, and L13A, and the exit ray vectors are indicated by L11B, L12B, and L13B.

FIG. 10B shows a prism thinning lens CL. In FIG. 10B, the prism thinning lens CL is added with a prism corresponding to a prism thinning amount at the prism measurement reference point O1. The prism measurement reference point O1 is shown as a geometric center O in FIGS. 1, 2, 3A, 3B, and 4 to 8.

A simulation is performed in which rays emitted from object points A1, A2, and A3 are to exit from the exit surface LO through the incident surface LI of the prism thinning lens CL.

Among the plurality of rays, the ray vectors L01, L02, and L03 exiting from any given point on the exit surface LO of the reference lens BL and individually directed toward an eyeball rotation point E are defined as a reference ray group LB0 of each line-of-sight direction of the reference lens BL.

Among the plurality of rays, ray vectors L21, L22, and L23 exiting from any given point on the exit surface LO of the prism thinning lens CL and individually directed toward an eyeball rotation point E are defined as a prism ray group LCO of each line-of-sight direction of the prism thinning lens CL.

The ray vector L21 includes an incident ray vector L21A emitted from the object point A1 and incident on a prism measurement reference point O1 of the incident surface LI, a vector directed toward a prism measurement reference point O1 of the exit surface LO from an incident position of the incident ray vector L21A, and an exit ray vector L21B directed toward an eyeball rotation point E from the prism measurement reference point O1 of the exit surface LO.

Similarly, the ray vector L22 includes an incident ray vector L22A emitted from the object point A2 and incident on the incident surface LI, a vector directed toward any given lens peripheral portion O2 of the exit surface LO from an incident position of the incident ray vector L22A, and an exit ray vector L22B directed toward the eyeball rotation point E from the lens peripheral portion O2 of the exit surface LO.

Similarly, the ray vector L23 includes an incident ray vector L23A emitted from the object point A3 and incident on the incident surface LI, a vector directed toward any given lens peripheral portion O3 of the exit surface LO from an incident position of the incident ray vector L23A, and an exit ray vector L23B directed toward an eyeball rotation point E from the lens peripheral portion O3 of the exit surface LO.

Here, an angle (deviation angle) formed by a direction of the exit ray vector L11B incident from the object point A1 and exiting from the prism measurement reference point O1 of the exit surface LO of the reference lens BL, and a direction of the exit ray vector L21B incident from the object point A1 and exiting from the prism measurement reference point O1 of the exit surface LO of the prism thinning lens CL is defined as θ1.

Similarly, an angle (deviation angle) formed by a direction of the exit ray vector L12B incident from the object point A2 and exiting from the lens peripheral portion O2 of the exit surface LO of the reference lens BL, and a direction of the exit ray vector L22B incident from the object point A2 and exiting from the lens peripheral portion O2 of the exit surface LO of the prism thinning lens CL is defined as θ2.

Similarly, an angle (deviation angle) formed by a direction of the exit ray vector L13B incident from the object point A3 and exiting from the lens peripheral portion O3 of the exit surface LO of the reference lens BL, and a direction of the exit ray vector L23B incident from the object point A2 and exiting from the lens peripheral portion O3 of the exit surface LO of the prism thinning lens CL is defined as θ3.

In the present embodiment, a shape of the exit surface LO of the prism thinning lens CL is determined such that each of the angle θ1, the angle θ2, and the angle θ3 becomes a constant angle θ. The constant angle θ may be, for example, a value of the angle γ itself corresponding to a prism amount, or may be a value of a predetermined ratio of the angle γ. A difference of the angle θ1, the angle θ2, and the angle θ3 with respect to the angle θ is obtained, and the inclination of the exit surface LO of the prism thinning lens is changed such that this difference becomes small.

An inclination of an optical surface of the exit surface LO at each position of the exit surface LO including the prism measurement reference point O1 and the lens peripheral portions O2 and O3 of the exit surface LO is changed.

Then, the incident ray vector L21A is rotated by a predetermined angle so as to be parallel to the incident ray vector L11A constituting the target ray group, and a direction of the exit ray vector L21B exiting from the prism measurement reference point O1 of the exit surface LO of the prism thinning lens CL is also changed.

Similarly, the incident ray vector L22A is rotated by a predetermined angle so as to be parallel to the incident ray vector L12A constituting the target ray group, and a direction of the exit ray vector L22B exiting from the lens peripheral portion O2 of the exit surface LO of the prism thinning lens CL is changed.

Similarly, the incident ray vector L23A is rotated by a predetermined angle so as to be parallel to the incident ray vector L13A constituting the target ray group, and a direction of the exit ray vector L23B exiting from the lens peripheral portion O3 of the exit surface LO of the prism thinning lens CL is also changed.

A similar simulation is performed on the prism thinning lens whose inclination of the optical surface of the exit surface LO has been changed, and the inclination of the optical surface of the exit surface LO is determined so as to cause the angle θ with a difference between the angle 81, the angle 82, and the angle 83 minimized finally, or ideally, to cause the angle 81, the angle 82, and the angle 83 each to become the angle θ.

[Designing Method for Spectacle Lens]

The designing method of the present embodiment will be specifically described with reference to FIG. 11.

Figure 11:
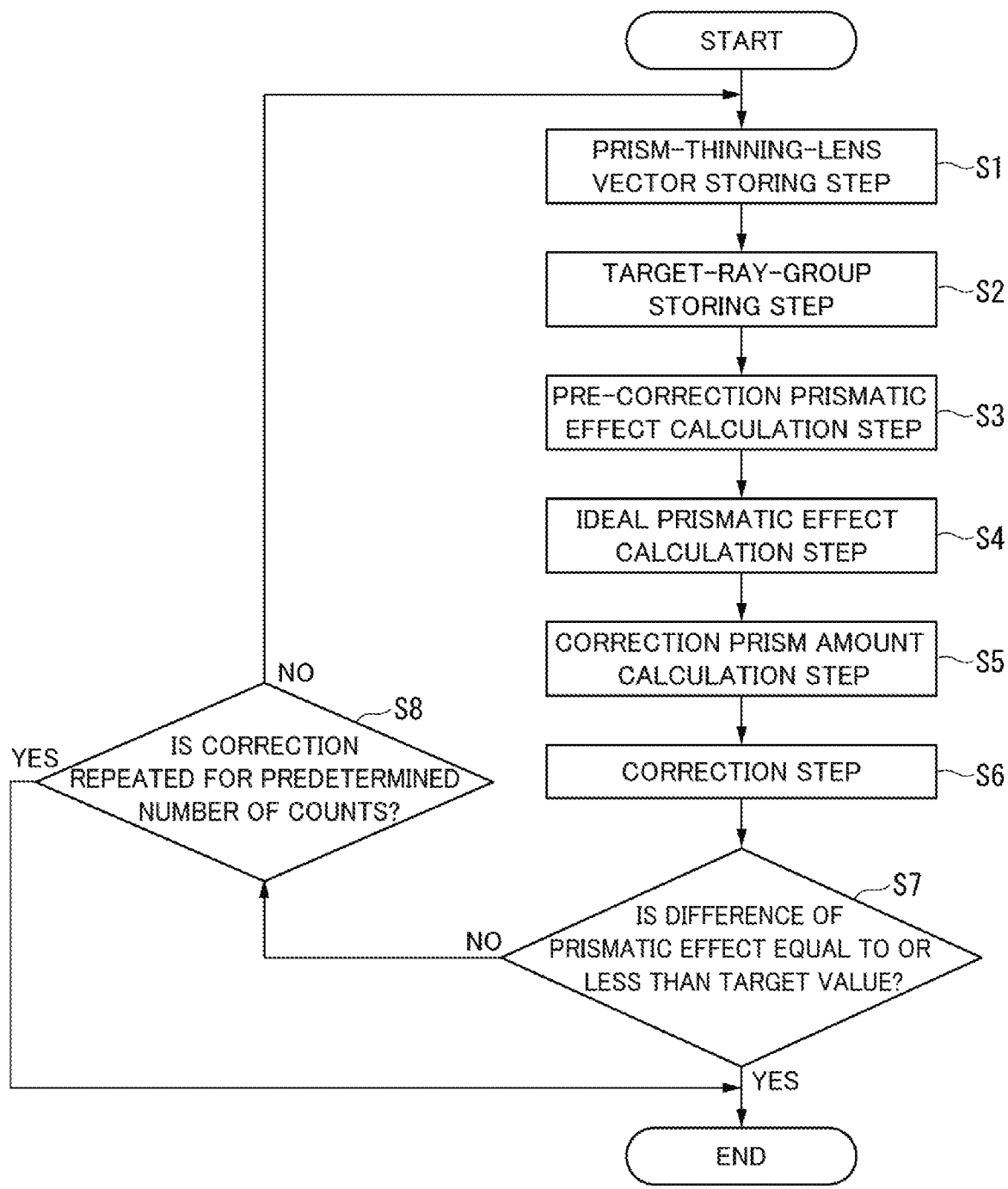
FIG. 11 is a flowchart showing a designing method for a spectacle lens.

FIG. 11 is a flowchart showing a designing method for a spectacle lens.

In the designing method of the present embodiment, as shown in the flowchart of FIG. 11, first, a prism-thinning-lens vector storing step S1 and a target-ray-group storing step S2 are performed. It should be noted that, in the present embodiment, the order of performing the prism-thinning-lens vector storing step S1 and the target-ray-group storing step S2 is not limited. The prism-thinning-lens vector storing step S1 may be performed after performing the target-ray-group storing step S2, or both may be performed simultaneously. In addition to FIG. 11, the following description also refers to FIGS. 10A and 10B.

[Prism-Thinning-Lens Vector Storing Step]

In the prism-thinning-lens vector storing step, among rays emitted from the object points A1, A2, and A3, and incident on the prism thinning lens CL and exiting from the prism thinning lens CL, a prism ray group LCO including a plurality of rays directed toward an eyeball rotation point E is created by the data creation unit 34. The data creation unit 34 performs simulation, and creates the incident ray vectors L21A, L22A, and L23A of rays incident on the incident surface LI from the object points A1, A2, and A3, and the exit ray vectors L21B, L22B, and L23B of rays exiting from the exit surface LO and directed toward an eyeball rotation point E. The created incident ray vectors L21A, L22A, and L23A and the exit ray vectors L21B, L22B, and L23B are stored in the prism-thinning-lens vector storing unit 311 (S1).

[Target-Ray-Group Storing Step]

In the target-ray-group storing step, a reference ray group LB0 including a plurality of rays directed toward an eyeball rotation point E is created among rays emitted from the object points A1, A2, and A3, and incident on the reference lens BL and exiting from the reference lens BL.

Then, based on the reference ray group LB0, the data creation unit 34 creates the incident ray vectors L11A, L12A, and L13A in a case where a plurality of rays are incident on the reference lens such that the plurality of rays respectively obtained by rotating the exit ray vectors L01B, L02B, and L03B by an angle γ corresponding to a prism amount are to exit and to be directed toward an eyeball rotation point.

The data creation unit 34 creates incident ray vectors L01A, L02A, and L03A and the exit ray vectors L01B, L02B, and L03B constituting the reference ray group LB0 through simulation. Further, the data creation unit 34 creates the incident ray vectors L11A, L12A, and L13A and the exit ray vectors L11B, L12B, and L13B constituting the target ray group, and stores these ray vectors in the target-ray-group storing unit 312 (S2).

[Pre-Correction Prismatic Effect Calculation Step]

In the pre-correction prismatic effect calculation step, the incident ray vectors L21A, L22A, and L23A and the exit ray vectors L21B, L22B, and L23B are called from the prism-thinning-lens vector storing unit 311, and a prismatic effect before the correction, that is, a prismatic effect of the current reference lens BL is calculated by the pre-correction prismatic effect calculation unit 36 (S3).

[Ideal Prismatic Effect Calculation Step]

In the ideal prismatic effect calculation step, the exit ray vectors L21B, L22B, and L23B stored in the prism-thinning-lens vector storing step S1, and the exit ray vectors L11B, L12B, and L13B stored in the target-ray-group storing step S2 are called, and a prismatic effect for obtaining an ideal exit ray that can be obtained when a ray is incident on the prism thinning lens CL is calculated by the ideal prismatic effect calculation unit 37 (S4). The ideal exit ray is an exit ray having angles θ1, θ2, and θ3 to be angles θ, in which angles θ1, θ2, and θ3 are formed by directions of the exit ray vectors L11B, L12B, and L13B incident from the object points A1, A2, and A3 and exiting from the exit surface LO of the reference lens BL, and directions of the exit ray vectors L21B, L22B, and L23B incident from the object points A1, A2, and A3 and exiting from the exit surface LO of the prism thinning lens CL. The angle θ is calculated by the ideal prismatic effect calculation unit 37.

[Correction Prism Amount Calculation Step]

The correction prism amount calculation unit 38 calculates a difference between a prismatic effect obtained in the pre-correction prismatic effect calculation step and a prismatic effect obtained in the ideal prismatic effect calculation step, and calculates a correction prism amount for correcting a slope of the exit surface LO based on the difference (S5). That is, the correction prism amount calculation unit 38 calculates each of a difference between the angle θ1 and the angle θ, a difference between the angle θ2 and the angle θ, and a difference between the angle θ3 and the angle θ.

[Correction Step]

In the correction step, the correction unit 39 corrects the slope of the exit surface LO based on the correction prism amount obtained in the correction prism amount calculation step (S6).

That is, the inclination of the exit surface on the optical surface including the prism measurement reference point O1 and the lens peripheral portions O2 and O3 of the exit surface LO is changed (refer to the one-dotted chain line LOA in FIG. 10B) so as to reduce the difference between the angle θ1 and the angle θ, the difference between the angle θ2 and the angle θ, and the difference between the angle θ3 and the angle θ calculated by the correction prism amount calculation unit 38. The above-mentioned inclination is a local inclination at each point corresponding to a plurality of any given points and includes a slope of the optical surface.

[Determination Step]

In the determination step, when the slope of the exit surface LO is corrected, step S1, step S3, step S5 are performed based on the exit surface LO, and it is determined whether or not the differences of the prismatic effect obtained in step S5, that is, the difference between the angle θ1 and the angle θ, the difference between the angle θ2 and the angle θ, and the difference between the angle θ3 and the angle θ are equal to or less than a target value (S7). Here, the target value is appropriately set in accordance with a type of the spectacle lens, a refractive power, and the like. The target value is stored in advance in the storage unit 31.

When the difference of the prismatic effect is equal to or less than the target value (YES), the design is completed. When the difference of prismatic effect exceeds the target value (NO), the number of corrections that are performed in step S6 is counted, and it is determined whether or not the counted number is less than a predetermined number of counts (S8).

The predetermined number of counts is appropriately set, for example, three. The set number of counts is stored in advance in the storage unit 31. When the counted number is less than the predetermined number of counts (YES), steps S1 to S6 are repeatedly performed. When the counted number of counts has reached the predetermined number (NO), the design is terminated.

The designing method of the spectacle lens having the above configuration is performed from a design program of the computer.

A specific example in which the above-mentioned designing method is applied to various spectacle lenses will be described with reference to the drawings.

Example 1: Progressive Power Lens with Prism Base Direction of Downward (Base Down), Prismatic Power of 1.25 (Δ), Addition ADD of 2.50 (D), and Spherical Refractive Power S of +3.0 (D)

Figure 12A:
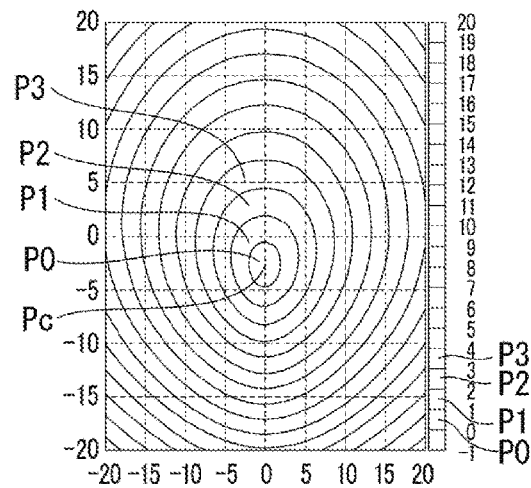
FIG. 12A is a schematic view showing a procedure of a designing method for a spectacle lens.
Figure 12B:
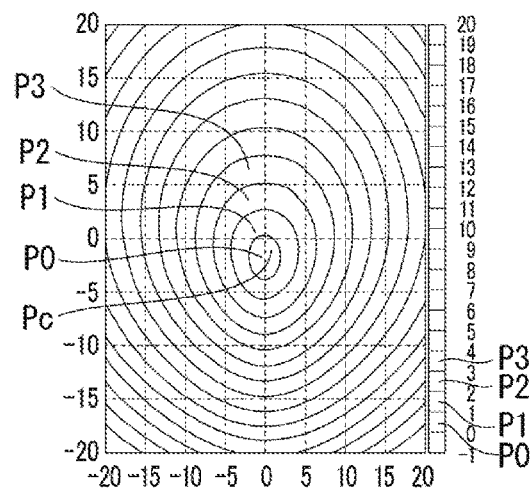
FIG. 12B is a schematic view showing a procedure of the designing method for a spectacle lens.
Figure 12C:
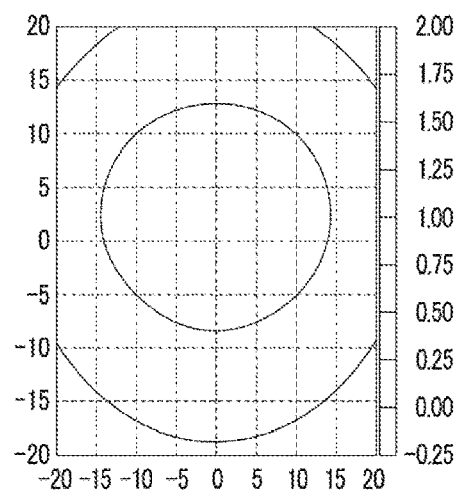
FIG. 12C is a schematic view showing a procedure of the designing method for a spectacle lens.

FIGS. 12A, 12B, and 12C are schematic views showing a procedure of a designing method for a spectacle lens.

FIG. 12A shows a distribution of a prism added with prism thinning at the prism measurement reference point O. Note that FIGS. 14A, 14B, and 14C to be described later correspond to FIGS. 12A, 12B, and 12C, respectively. In these figures, coordinates are coordinate positions of the exit surface LO, the left side of each figure is the nose side, and the right side is the ear side.

In the prism distribution shown in FIG. 12A, a position Pc (coordinates (0, −2)) at a distance of 2 mm downward from the origin of coordinates (0, 0) is a center of a region P0 with a prism amount ΔP of 0 to 1 (D). Then, outside of the region P0 is a region P1 where the prism amount ΔP is 1 to 2 (D). Further, outside of the region P1 is a region P2 where the prism amount ΔP is 2 to 3 (D). Then, outside of the region P2 is a region P3 where the prism amount ΔP is 2 to 3 (D). Therefore, in the prism distribution, the prism amount ΔP increases in units of 1D as going outward with the position Pc as a center. The prism distribution of FIG. 12A is stored in the prism-thinning-lens vector storing step S1.

FIG. 12B shows a reference prism distribution in the reference lens.

As shown in FIG. 12B, in the reference prism distribution, a smallest elliptical region including a position Pc at a distance of 2 mm downward from the origin is a region P0 with a prism amount of 0 to 1 (D), and elliptical regions having different diameters are arranged concentrically with the prism measurement reference point O1. The prism distribution of FIG. 12B is stored in the target-ray-group storing step S2.

In FIG. 12C, in a difference prism distribution, a prism amount in a region including a position (coordinates (0, 3)) of 3 mm upward from the origin is 0.0 to 0.25 (D). Then, a prism amount of a region located outside of this region is 0.25 to 0.50 (D). Further, a prism amount of a region located outside of this is 0.50 to 0.75 (D).

The difference prism distribution shown in FIG. 12C is obtained in the correction prism amount calculation step S5.

An experiment showing that a deviation of a visual line at a lens periphery is eliminated by the designing method of the above procedure will be described with reference to FIGS. 13A and 13B.

Figure 13A:
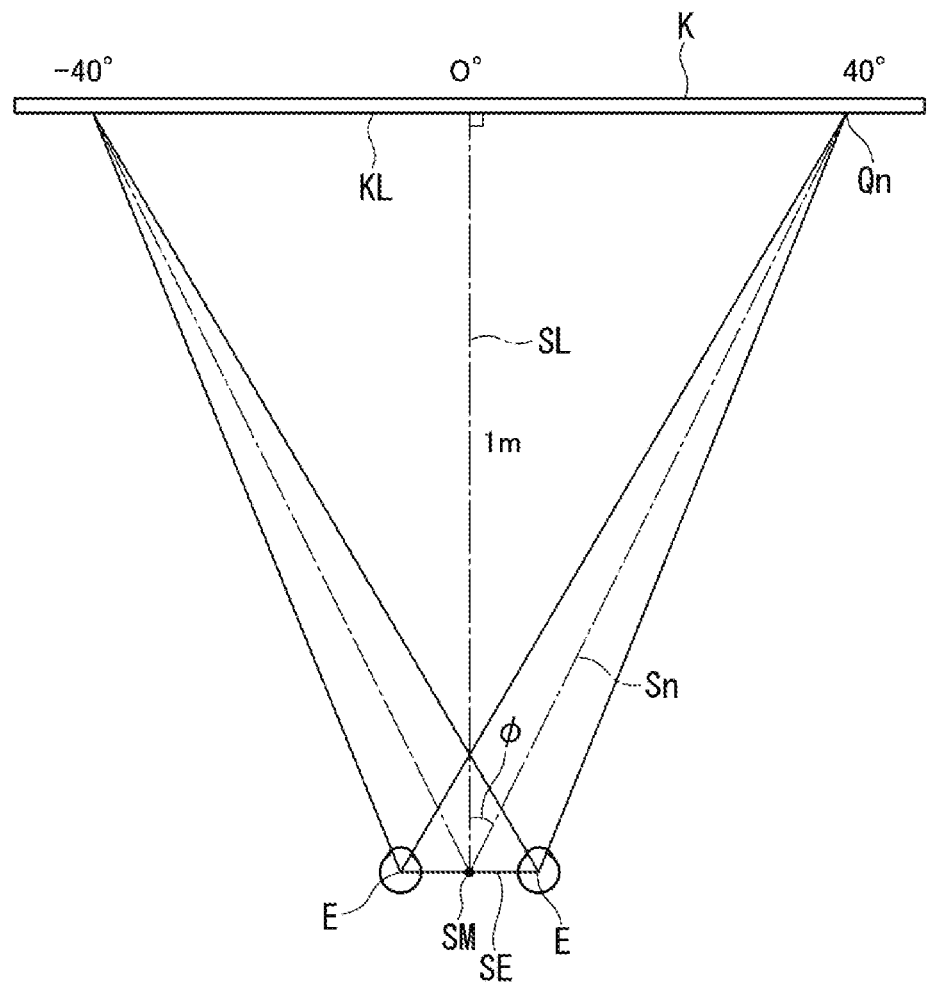
FIG. 13A is a schematic view for explaining an experiment that an effect is obtained by a procedure of a designing method.
Figure 13B:
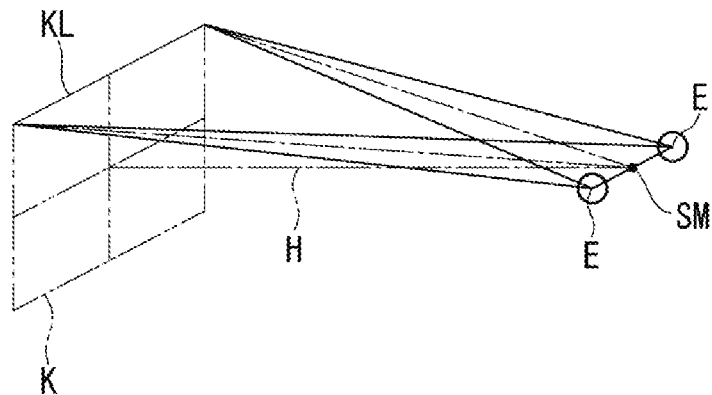
FIG. 13B is a schematic view for explaining an experiment that an effect is obtained by a procedure of a designing method.

FIGS. 13A and 13B are schematic views for explaining an experiment that an effect is obtained by a procedure of a designing method.

FIG. 13A shows an outline of an experiment when an object surface K at 1 m ahead of the eyeballs is viewed with the left and right eyes. FIG. 13B is a schematic view showing a deviation of a visual line when a line KL above a horizontal direction H in the object surface K and along a horizontal direction is viewed with the left and right eyes. In the calculation of a deviation of the visual line, first, it is defined that φ is an angle formed by a normal line SL, of the object surface K, passing through a midpoint SM of a straight line SE connecting left and right eyeball rotation point E, and a connecting line Sn between a predetermined position Qn on the line KL and the midpoint SM. The angle φ is 0° when the line Sn coincides with the normal line SL, and is positive on the right side in FIG. 13A and negative on the left side. Rays are tracked passing through respective eyeball rotation points of the right eye and the left eye, from object points each at angles φ of 40°, 30°, 20°, 10°, 0°, −10°, −20°, −30°, and −40°. Then, a position where an exit ray vector exiting from the exit surface of the lens is extended toward the object surface K and strikes the object surface is calculated for each of exit ray vectors of the right and left eyes. As a result of the calculation, a difference between a position calculated from the right eye and a position calculated from the left eye is the deviation of the visual line. Table 1 is a result of obtaining each of a difference of a deviation of the visual line between Example 1 and a lens without prism, and a difference of a deviation of the visual line between Comparative Example 1 and a lens without prism.

TABLE 1

| Angle φ (°) | -40 | -30 | -20 | -10 | 0 | 10 | 20 | 30 | 40 |
|---|---|---|---|---|---|---|---|---|---|
| Example 1 (mm) | 2.25 | 0.21 | 0.70 | 0.12 | 1.27 | 1.12 | 0.70 | 0.21 | 2.25 |
| Comparative Example 1 (mm) | 3.58 | 0.21 | 1.12 | 1.71 | 1.91 | 1.71 | 1.12 | 0.21 | 3.58 |

A difference between a maximum value (2.25 mm) and a minimum value (0.21 mm) in Example 1 is 2.04 mm. On the other hand, a difference between a maximum value (3.58 mm) and a minimum value (0.21 mm) in Comparative Example 1 is 3.37 mm. When comparing the difference between the maximum value and the minimum value, it can be seen that the difference in Example 1 is smaller than that in Comparative Example 1, and the deviation of the visual line at each angle is small.

Example 2: Progressive Power Lens with Prism Base Direction of Lower Side (Base Down), Prismatic Power of 1.25 (Δ), Addition ADD of 2.50 (D), and Spherical Refractive Power S of 0 (D)

Figure 14A:
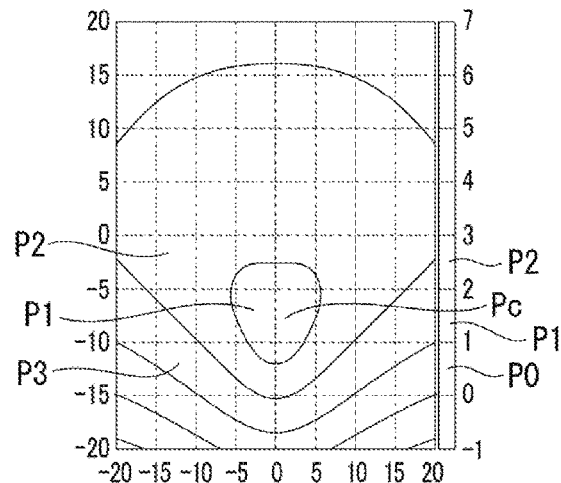
FIG. 14A is a schematic view showing a procedure of a designing method for a spectacle lens.
Figure 14B:
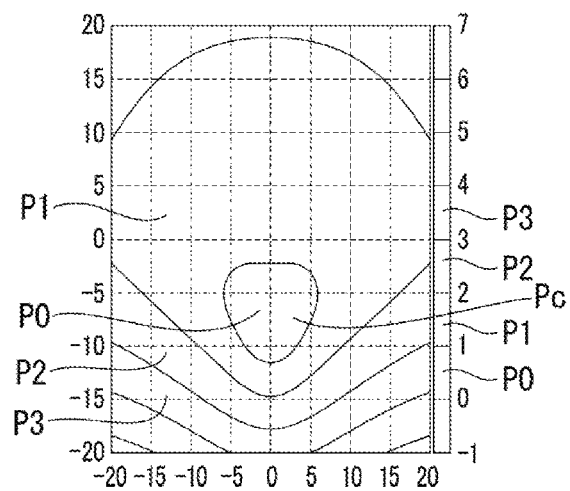
FIG. 14B is a schematic view showing a procedure of the designing method for a spectacle lens.
Figure 14C:
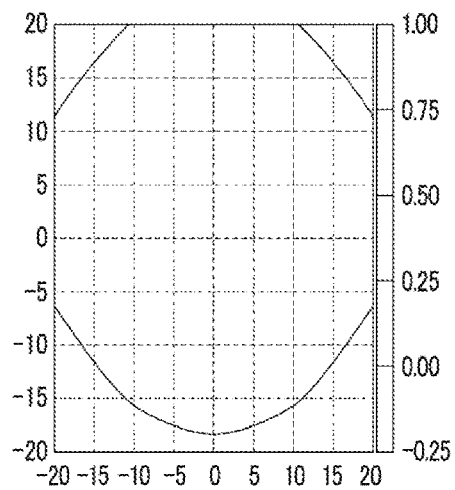
FIG. 14C is a schematic view showing a procedure of the designing method for a spectacle lens.

FIGS. 14A, 14B, and 14C are schematic views showing a procedure of a designing method for a spectacle lens.

In FIG. 14A, a position Pc of coordinates (0, -8) is a center of a region P0 with a prism amount of 0 to 1 (D). A prism distribution of FIG. 14A is stored in the prism-thinning-lens vector storing step S1.

In a reference prism distribution shown in FIG. 14B, a smallest region P0 including coordinates (0, -8) is a region P0 with a prism amount of 0 to 1 (D). Then, there is arranged an elliptical region having a different diameter concentrically with the region P0, having a prism amount of 1 (D), and increasing with a pitch. The prism distribution of FIG. 14B is stored in the target-ray-group storing step S2.

In a difference prism distribution shown in FIG. 14C, a prism amount of a region including an origin of coordinates (0, 0) is 0.00 to 0.25 (D), and outside thereof is a region where a prism amount is 0.25 to 0.50 (D). The difference prism distribution shown in FIG. 14C is obtained in the correction prism amount calculation step S5.

A description will be given to the fact that a deviation of a visual line at a lens periphery is eliminated by the designing method of the above procedure.

Table 2 is a result of obtaining each of a difference of a deviation of the visual line between Example 2 and a lens without prism, and a difference of a deviation of the visual line between Comparative Example 2 and a lens without prism.

TABLE 2

| Angle φ (°) | -40 | -30 | -20 | -10 | 0 | 10 | 20 | 30 | 40 |
|---|---|---|---|---|---|---|---|---|---|
| Example 2 (mm) | 0.15 | 0.03 | 0.04 | 0.08 | 0.10 | 0.08 | 0.04 | 0.03 | 0.15 |
| Comparative Example 2 (mm) | 0.39 | 0.07 | 0.11 | 0.22 | 0.27 | 0.22 | 0.11 | 0.07 | 0.39 |

A difference between a maximum value (0.15 mm) and a minimum value (0.03 mm) in Example 2 is 0.12 mm. On the other hand, a difference between a maximum value (0.39 mm) and a minimum value (0.07 mm) in Comparative Example 2 is 0.32 mm. When comparing the difference between the maximum value and the minimum value, it can be seen that the difference in Example 2 is smaller than that in Comparative Example 2, and the deviation of the visual line at each angle is small.

Example 3: Progressive Power Lens with Prism Base Direction of Lower Side (Base Down), Prismatic Power of 1.25 (Δ), Addition Add of 2.50 (D), and Spherical Refractive Power S of -3.0 (D)

Figure 15A:
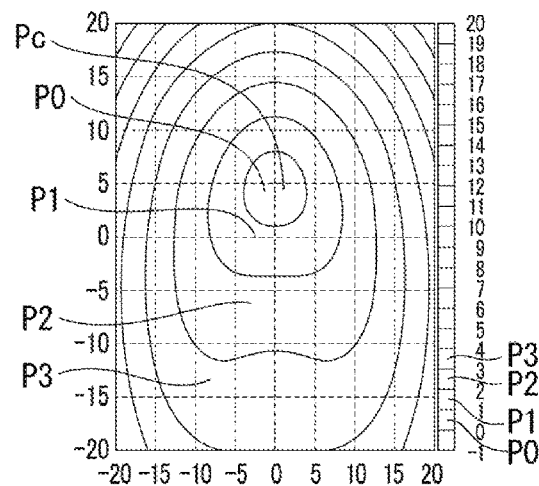
FIG. 15A is a schematic view showing a procedure of a designing method for a spectacle lens.
Figure 15B:
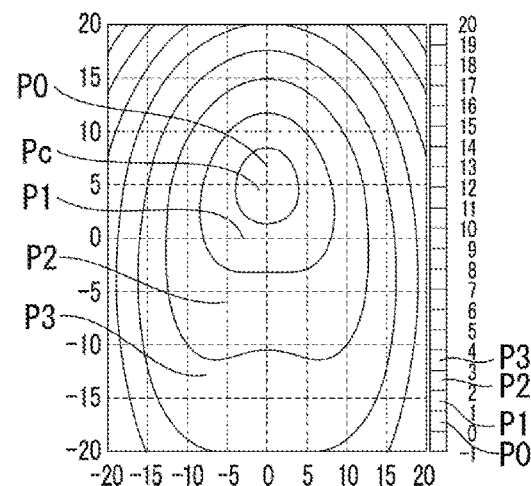
FIG. 15B is a schematic view showing a procedure of the designing method for a spectacle lens.
Figure 15C:
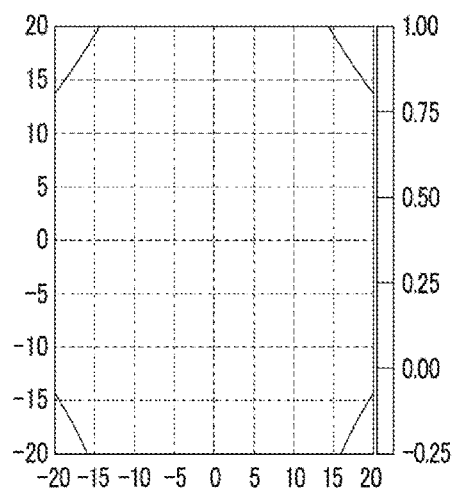
FIG. 15C is a schematic view showing a procedure of the designing method for a spectacle lens.

FIGS. 15A, 15B, and 15C are schematic views showing a procedure of a designing method for a spectacle lens.

FIG. 15A is a prism distribution in which a position Pc of coordinates (0, 5) is a center of a region P0 where a prism amount is 0 to 1 (D). The prism distribution of FIG. 15A is stored in the prism-thinning-lens vector storing step S1.

In a reference prism distribution shown in FIG. 15B, a smallest region P0 including coordinates (0, 5) is a region P0 with a prism amount of 0 to 1 (D). Then, there are arranged elliptical regions having different region sizes and prism amounts concentrically with the region P0. The prism distribution of FIG. 15B is stored in the target-ray-group storing step S2.

In a difference prism distribution shown in FIG. 15C, a prism amount of a region including the origin of the coordinate (0, 0) is 0.00 to 0.25 (D). Then, outside thereof is a region with a prism amount of 0.25 to 0.50 (D). The difference prism distribution shown in FIG. 15C is obtained in the correction prism amount calculation step S5.

A description will be given to the fact that a deviation of a visual line at a lens periphery is eliminated by the designing method of the above procedure.

Table 3 shows a result of obtaining each of a difference of a deviation of the visual line between Example 3 and a lens without prism, and a difference of a deviation of the visual line between Comparative Example 3 and a lens without prism.

TABLE 3

| Angle φ (°) | −40 | −30 | −20 | −10 | 0 | 10 | 20 | 30 | 40 |
|---|---|---|---|---|---|---|---|---|---|
| Example 3 (mm) | 0.02 | 0.00 | 0.01 | 0.01 | 0.01 | 0.01 | 0.01 | 0.00 | 0.02 |
| Comparative Example 3 (mm) | 0.03 | 0.02 | 0.00 | 0.02 | 0.05 | 0.02 | 0.00 | 0.02 | 0.03 |

A difference between a maximum value (0.02 mm) and a minimum value (0.00 mm) in Example 3 is 0.02 mm. On the other hand, a difference between a maximum value (0.03 mm) and a minimum value (0.00 mm) in Comparative Example 3 is 0.03 mm. When comparing the difference between the maximum value and the minimum value, it can be seen that the difference in Example 3 is smaller than that in Comparative Example 3, and the deviation of the visual line at each angle is small.

Example 4: Progressive Power Lens with Prism Base Direction of Upper Side (Base Up), Prismatic Power of 1.25 (Δ), Addition ADD of 2.50 (D), and Spherical Refractive Power S of +3.0 (D)

Figure 16A:
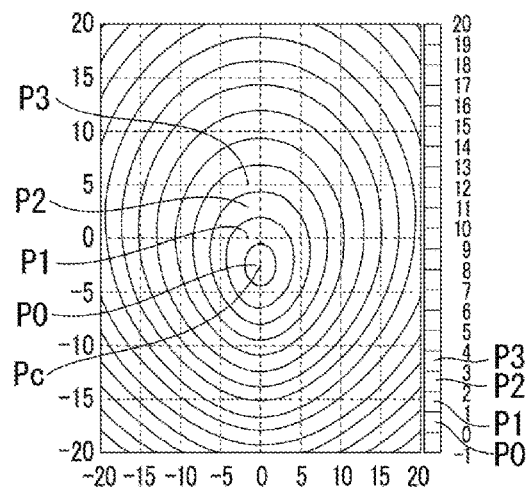
FIG. 16A is a schematic view showing a procedure of a designing method for a spectacle lens.
Figure 16B:
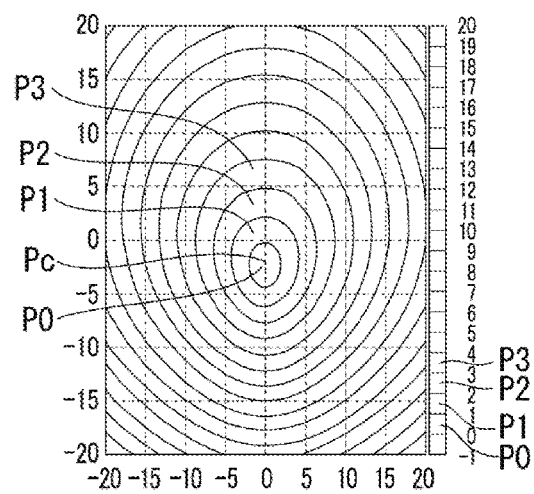
FIG. 16B is a schematic view showing a procedure of the designing method for a spectacle lens.
Figure 16C:
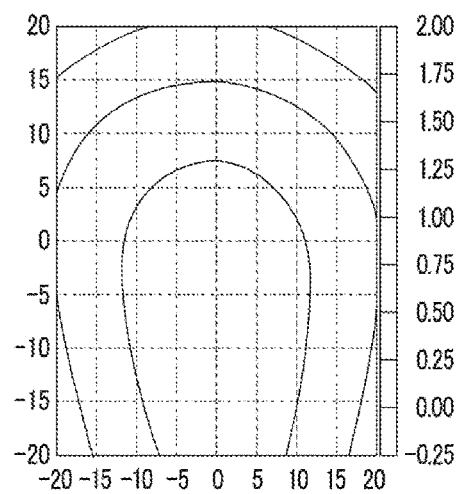
FIG. 16C is a schematic view showing a procedure of the designing method for a spectacle lens.

FIGS. 16A, 16B, and 16C are schematic views showing a procedure of a designing method for a spectacle lens.

In FIG. 16A, a position Pc of coordinates (0, −3) is a center of a region P0 with a prism amount of 0 to 1 (D). A prism distribution of FIG. 16A is stored in the prism-thinning-lens vector storing step S1.

In a reference prism distribution shown in FIG. 16B, a smallest region P0 including coordinates (0, −3) is a region P0 with a prism amount of 0 to 1 (D). Then, there are arranged elliptical regions having different diameters and increasing concentrically with the region P0. The prism distribution of FIG. 16B is stored in the target-ray-group storing step S2.

In a difference prism distribution shown in FIG. 16C, a prism amount of a region including the origin of the coordinate (0, 0) is 0.00 to 0.25 (D). Then, outside thereof is a region with a prism amount of 0.25 to 0.50 (D). The difference prism distribution shown in FIG. 16C is obtained in the correction prism amount calculation step S5.

A description will be given to the fact that a deviation of a visual line at a lens periphery is eliminated by the designing method of the above procedure.

Table 4 shows a result of obtaining each of a difference of a deviation of the visual line between Example 4 and a lens without prism, and a difference of a deviation of the visual line between Comparative Example 4 and a lens without prism.

TABLE 4

| Angle φ (°) | −40 | −30 | −20 | −10 | 0 | 10 | 20 | 30 | 40 |
|---|---|---|---|---|---|---|---|---|---|
| Example 4 (mm) | 2.27 | 0.13 | 0.70 | 1.09 | 1.22 | 1.09 | 0.70 | 0.13 | 2.27 |
| Comparative Example 4 (mm) | 3.15 | 0.15 | 0.98 | 1.49 | 1.66 | 1.49 | 0.98 | 0.15 | 3.15 |

A difference between a maximum value (2.27 mm) and a minimum value (0.13 mm) in Example 4 is 2.14 mm. On the other hand, a difference between a maximum value (3.15 mm) and a minimum value (0.15 mm) in Comparative Example 4 is 3.00 mm. When comparing the difference between the maximum value and the minimum value, it can be seen that the difference in Example 4 is smaller than that in Comparative Example 4, and the deviation of the visual line at each angle is small.

Example 5: Progressive Power Lens with Prism Base Direction of Upper Side (Base Up), Prismatic Power of 1.25 (Δ), Addition ADD of 2.50 (D), and Spherical Refractive Power S of 0 (D)

Figure 17A:
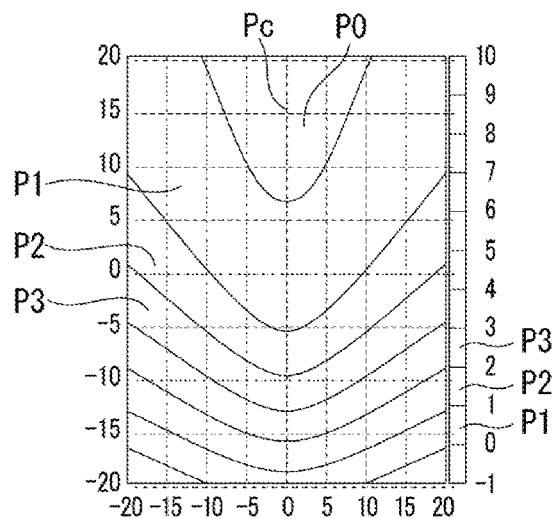
FIG. 17A is a schematic view showing a procedure of a designing method for a spectacle lens.
Figure 17B:
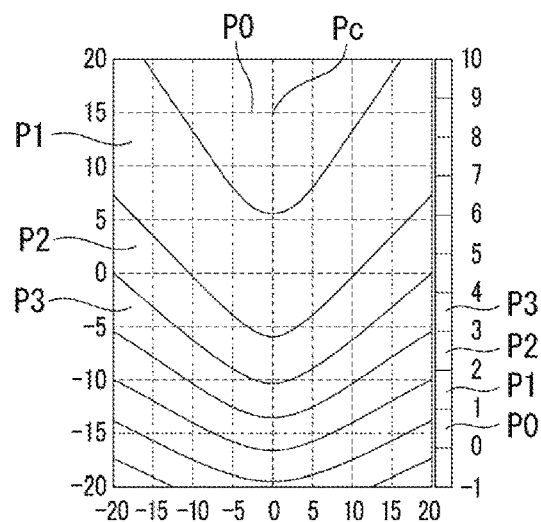
FIG. 17B is a schematic view showing a procedure of the designing method for a spectacle lens.
Figure 17C:
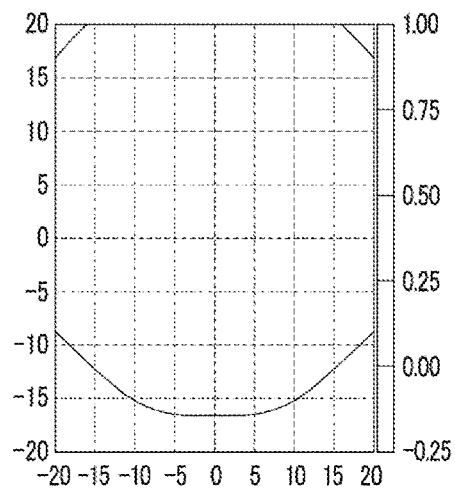
FIG. 17C is a schematic view showing a procedure of the designing method for a spectacle lens.

FIGS. 17A, 17B, and 17C are schematic views showing a procedure of a designing method for a spectacle lens.

In FIG. 17A, a position Pc of coordinates (0,15) is a center of a region P0 with a prism amount of 0 to 1 (D). A prism distribution of FIG. 17A is stored in the prism-thinning-lens vector storing step S1.

In a reference prism distribution shown in FIG. 17B, a smallest region P0 including coordinates (0, 15) is a region P0 with a prism amount of 0 to 1 (D). Then, there are arranged elliptical regions having different diameters and increasing concentrically with the region P0. The prism distribution of FIG. 17B is stored in the target-ray-group storing step S2.

In a difference prism distribution shown in FIG. 17C, a prism amount of a region including the origin of the coordinate (0, 0) is 0.00 to 0.25 (D). Then, outside thereof is a region with a prism amount of 0.25 to 0.50 (D). The difference prism distribution shown in FIG. 17C is obtained in the correction prism amount calculation step S5.

A description will be given to the fact that a deviation of a visual line at a lens periphery is eliminated by the designing method of the above procedure.

Table 5 shows a difference of a mean curvature between Example 5 and a lens without prism, and a difference of a mean curvature between Comparative Example 5 and a lens without prism.

TABLE 5

| Angle φ (°) | −40 | −30 | −20 | −10 | 0 | 10 | 20 | 30 | 40 |
|---|---|---|---|---|---|---|---|---|---|
| Example 5 (mm) | 0.15 | 0.03 | 0.04 | 0.09 | 0.11 | 0.09 | 0.04 | 0.03 | 0.15 |
| Comparative Example 5 (mm) | 0.34 | 0.07 | 0.10 | 0.19 | 0.24 | 0.19 | 0.10 | 0.07 | 0.34 |

A difference between a maximum value (0.15 mm) and a minimum value (0.03 mm) in Example 5 is 0.12 mm. On the other hand, a difference between a maximum value (0.34 mm) and a minimum value (0.07 mm) in Comparative Example 5 is 0.27 mm. When comparing the difference between the maximum value and the minimum value, it can be seen that the difference in Example 5 is smaller than that in Comparative Example 5, and the deviation of the visual line at each angle is small.

Example 6: Progressive Power Lens with Prism Base Direction of Upper Side (Base Up Direction), Prismatic Power of 1.25 (Δ), Addition ADD of 2.50 (D), and Spherical Refractive Power S of −3.0 (D)

Figure 18A:
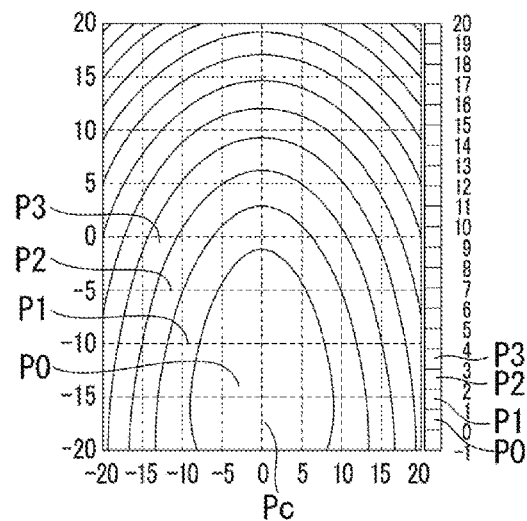
FIG. 18A is a schematic view showing a procedure of a designing method for a spectacle lens.
Figure 18B:
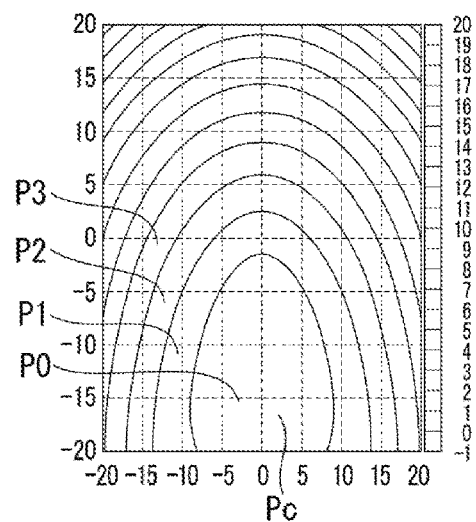
FIG. 18B is a schematic view showing a procedure of the designing method for a spectacle lens.
Figure 18C:
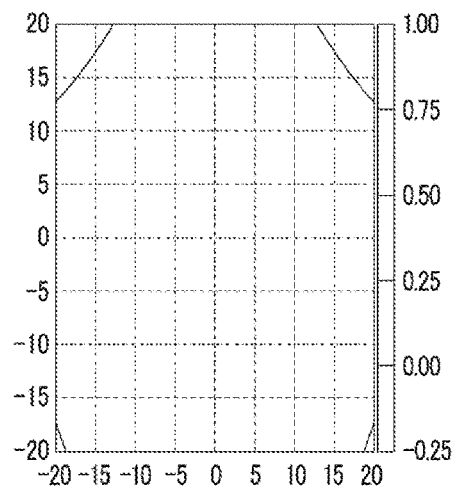
FIG. 18C is a schematic view showing a procedure of the designing method for a spectacle lens.

FIGS. 18A, 18B, and 18C are schematic views showing a procedure of a designing method for a spectacle lens.

In FIG. 18A, a position Pc of coordinates (0, −15) is a center of a region P0 with a prism amount of 0 to 1 (D). A prism distribution of FIG. 18A is stored in the prism-thinning-lens vector storing step S1.

In a reference prism distribution shown in FIG. 18B, a smallest region P0 including coordinates (0, −15) is a region P0 with a prism amount of 0 to 1 (D). Then, there are arranged elliptical regions having different diameters and increasing concentrically with the region P0. The prism distribution of FIG. 18B is stored in the target-ray-group storing step S2.

In a difference prism distribution shown in FIG. 18C, a prism amount of a region including an origin of coordinates (0, 0) is 0.00 to 0.25 (D), and outside thereof is a region where a prism amount is 0.25 to 0.50 (D). The difference prism distribution shown in FIG. 18C is obtained in the correction prism amount calculation step S5.

A description will be given to the fact that a deviation of a visual line at a lens periphery is eliminated by the designing method of the above procedure.

Table 6 shows a difference of a mean curvature between Example 6 and a lens without prism, and a difference of a mean curvature between Comparative Example 6 and a lens without prism.

TABLE 6

| Angle φ (°) | -40 | -30 | -20 | -10 | 0 | 10 | 20 | 30 | 40 |
|---|---|---|---|---|---|---|---|---|---|
| Example 6 (mm) | 0.02 | 0.00 | 0.01 | 0.01 | 0.01 | 0.01 | 0.01 | 0.00 | 0.02 |
| Comparative Example 6 (mm) | 0.03 | 0.02 | 0.00 | 0.02 | 0.04 | 0.02 | 0.00 | 0.02 | 0.03 |

A difference between a maximum value (0.02 mm) and a minimum value (0.00 mm) in Example 6 is 0.02 mm. On the other hand, a difference between a maximum value (0.04 mm) and a minimum value (0.00 mm) in Comparative Example 6 is 0.04 mm. When comparing the difference between the maximum value and the minimum value, it can be seen that the difference in Example 6 is smaller than that in Comparative Example 6, and the deviation of the visual line at each angle is small.

[Spectacle Lens Producing Apparatus]

Next, one embodiment of a spectacle lens producing apparatus according to the present invention will be described with reference to FIG. 19.

Figure 19:
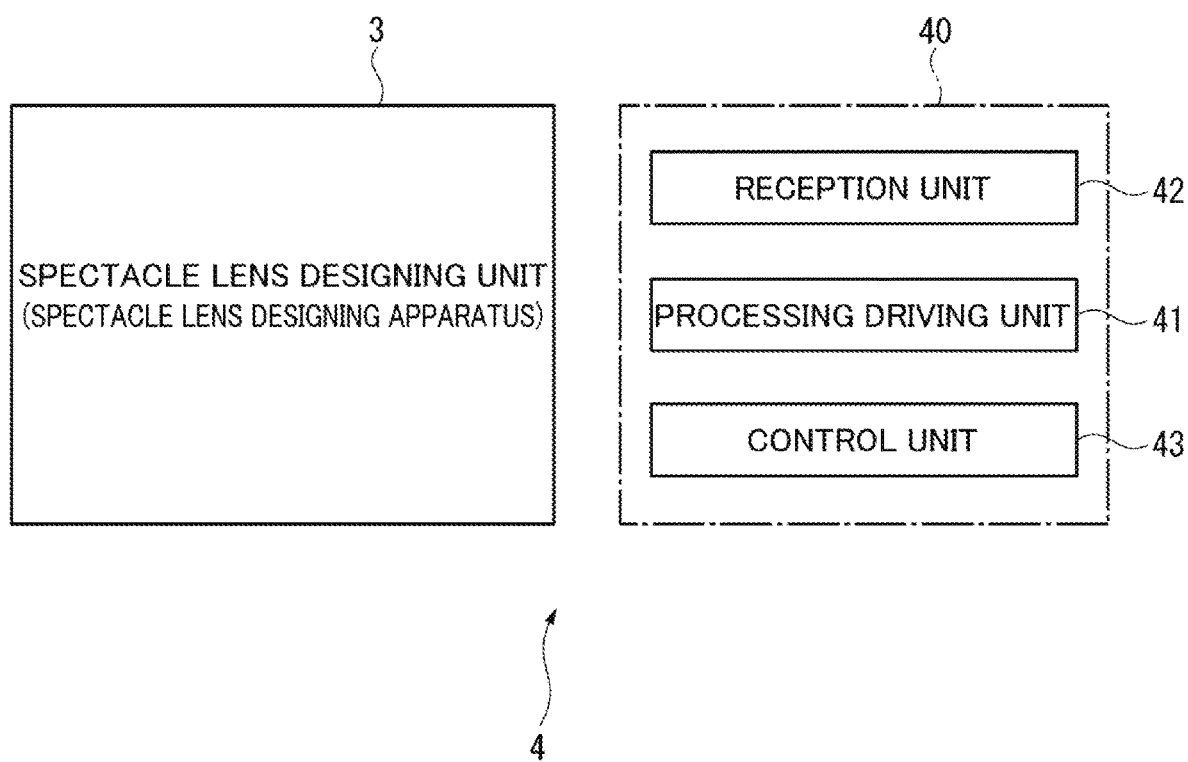
FIG. 19 is a block diagram showing a spectacle lens producing apparatus according to one embodiment of the present invention.

In FIG. 19, a spectacle lens producing apparatus 4 includes a spectacle lens designing unit configured to design a spectacle lens, and a processing unit 40 configured to process a spectacle lens designed in the spectacle lens designing unit.

The spectacle lens designing unit is same as the spectacle lens designing apparatus 3 shown in FIG. 8.

The processing unit 40 is configured to have a processing unit main body (not shown) configured to process a lens material, a processing driving unit 41 configured to drive the processing unit main body, a reception unit 42 configured to receive data designed by the spectacle lens designing apparatus 3, and a control unit 43 configured to control the processing driving unit 41 based on the data received by the reception unit 42.

The processing unit main body includes a tool (not shown) to realize grinding, polishing, and the like, and the processing driving unit 41 is a motor or the like to drive the tool.

The reception unit 42 receives data transmitted from the transmission/reception unit 33 of the spectacle lens designing apparatus 3. Here, the reception unit 42 and the transmission/reception unit 33 are electrically connected via radio or a code. Further, in the present embodiment, data designed by the spectacle lens designing apparatus 3 may be stored in a storage medium such as a USB memory, and the reception unit 42 may receive the design data from the storage medium.

[Producing Method for Spectacle Lens]

Next, a producing method for a spectacle lens of the present invention will be described with reference to FIG. 20.

Figure 20:
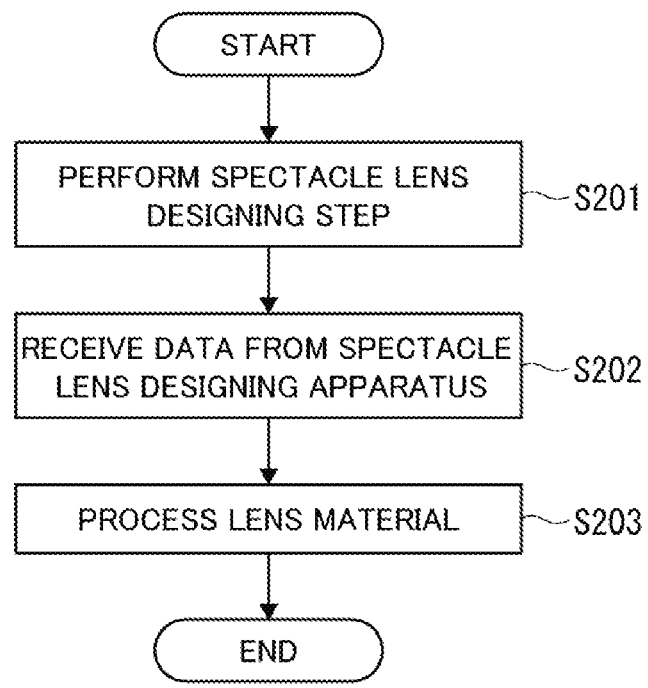
FIG. 20 is a flowchart showing a producing method for a spectacle lens.

FIG. 20 is a flowchart showing a producing method for a spectacle lens.

In FIG. 20, first, a spectacle lens designing step is performed by the spectacle lens designing apparatus 3 (S201). The spectacle lens designing step is performed in accordance with the procedure of the designing method for a spectacle lens shown in FIG. 11.

Then, a processing step of processing the spectacle lens designed in the designing step for the spectacle lens is performed.

That is, when the reception unit 42 receives the data transmitted from the transmission/reception unit 33 of the spectacle lens designing apparatus 3 (S202), the processing driving unit 41 drives the tool or the like to process a lens material under the control of the control unit 43 (S203).

[Effect of Embodiment]

(1) As shown in FIG. 2, a spherical refractive power S was positive, a prism base direction of a prism provided at the prism measurement reference point O was set toward the near-portion side, a mean curvature at least in a direction in which the refractive power decreases from the fitting point FP in the Y direction was smaller than a mean curvature in a lens curved surface along the Y direction of a lens without prism, and a mean-curvature difference N11 was negative.

The inventor of the present invention obtained a mean curvature along a direction passing through a midpoint of a connecting line between two alignment reference marks and orthogonal to this connecting line for each of a lens without prism and a conventional lens added with prism thinning only to a desired prism only in the vicinity of the prism measurement reference point O, and examined a mean-curvature difference of the lens without prism with respect to the mean curvature of the lens of the Comparative Example. The result has shown that a mean value of the mean-curvature difference is larger in the first refractive portion side from the fitting point FP as compared with the second refractive portion side, in the conventional lens in which the spherical refractive power of the first refractive portion is positive and the prism base direction of the prism provided at the prism measurement reference point O is set toward the second refractive portion side. This will cause a large prismatic effect in the first refractive portion as compared with the prism added to the prism thinning lens, which is considered to cause a deviation of the visual line in both the left and right eyes.

Therefore, in the present invention, a mean value of a difference of the mean curvature with respect to the mean curvature of the lens without prism was set smaller in the first-refractive-portion-side region from the fitting point FP with respect to the second-refractive-portion-side region from the fitting point FP. This eliminates the prismatic effect that is too large with respect to the added prism in the first refractive portion, which has occurred in the lens of the Comparative Example, reducing a deviation of the visual line in the periphery. In each of both eyes, when there is no deviation of the visual line in the periphery, a deviation of the visual line between both the left and right eyes is eliminated. Here, the difference with respect to the mean curvature is, for example, a difference obtained by subtracting the mean curvature of the spectacle lens of the present application from the mean curvature of the reference lens.

(2) Furthermore, as shown in FIG. 2, a spherical refractive power S of the distance portion was positive, a prism base direction of a prism provided at the prism measurement reference point O (e.g., the geometric center O) was set toward the near-portion side, and mean values V1A and V1B of the difference N11 of a mean curvature along the Y direction with respect to a mean curvature along the Y direction in a lens curved surface of a lens without prism were set such that the mean value V1A of a distance-portionside region from the fitting point FP was smaller than the mean value V1B of a near-portion-side region from the fitting point FP.

It has been found that, in the conventional lens, the mean-curvature difference increases in the positive direction as separating from the prism measurement reference point O in the first refractive portion. This indicates that the mean curvature of the conventional lens is small with respect to the lens curved surface of the lens without prism. Because the mean curvature is smaller than that of the lens without prism, the prism amount at a point away from the prism measurement reference point O in the direction of the first refractive portion is to become larger than a prism amount provided at the prism measurement reference point O (hereinafter, this state is referred to as a prism imbalance). This will cause a deviation of the visual line in viewing with both the left and right eyes. Therefore, in the present invention, considering that the prism amount becomes larger in the direction of the first refractive portion from the prism measurement reference point O than that at the prism measurement reference point O with respect to the provided prism amount, the difference with respect to the mean curvature in the lens curved surface of the lens without prism was increased. This is to eliminate the prism imbalance, and eliminate a deviation of the visual line between both the left and right eyes.

Whereas, in the conventional lens, it has been found that the mean value of the mean-curvature difference is smaller in the first-refractive-portion-side region than that in the second-refractive-portion-side region from the fitting point FP. This will cause a prismatic effect that is too small in the first refractive portion as compared with the prism added to the prism thinning lens, which is considered to cause a deviation of the visual line in both the left and right eyes.

Therefore, in the spectacle lens of the present invention, when a difference between a mean curvature of the reference lens and a mean curvature of the spectacle lens is defined as a mean-curvature difference, a mean value of the mean-curvature difference in the second-refractive-portion-side region with the fitting point FP as a boundary in the orthogonal direction is smaller than a mean value of the mean-curvature difference in the first-refractive-portion-side region. This eliminates the prismatic effect that is too small with respect to the added prism in the first refractive portion, which has occurred in the lens of the Comparative Example, reducing a deviation of the visual line in the periphery.

(3) Even with a conventional lens in which a spherical refractive power of a distance portion is negative or zero and a prism base direction of the conventional prism provided at the prism measurement reference point O is set toward the near-portion side, a prism amount at a point away from the prism measurement reference point O in the direction of the first refractive portion is to become larger than a prism amount provided at the prism measurement reference point O.

Therefore, in the present invention, the value is set to 0.02 (D) or less in the mean-curvature difference at the distance-power measurement position. This will cause the lens surface to be provided with a slope that eliminates the prism imbalance, which occurs as the mean curvature with respect to the lens curved surface of the lens without prism has been small (the mean-curvature difference with respect to the lens curved surface of the lens without prism has been positive) as in the Comparative Example, so that the deviation of the visual line between both the left and right eyes is eliminated.

As shown in FIG. 6, a spherical refractive power S was positive, a prism base direction of a prism provided at the prism measurement reference point O was set toward the distance portion side, and mean values V1A and V1B of a difference of a mean curvature along the Y direction with respect to a mean curvature along the Y direction in a lens curved surface of a lens without prism were set such that the mean value V1A of a distance-portion-side region from the fitting point FP was larger than the mean value V1B of a near-portion-side region from the fitting point FP. The spectacle lens of the present invention is preferably configured such that a mean curvature at least in a direction in which a refractive power decreases from the fitting point FP in the above-mentioned direction is smaller than the mean curvature along the above-mentioned direction in the lens curved surface of the lens without prism.

In the present invention, since the mean curvature in the direction in which the refractive power decreases from the fitting point FP is made smaller than the mean curvature of the lens without prism, the too small prismatic effect occurring in the first refractive portion is canceled out, and the deviation of the visual line in the periphery is reduced.

(4) As shown in FIG. 6, a spherical refractive power S was positive, a prism base direction of a prism provided at the prism measurement reference point O was set toward the distance portion side, a mean value of a mean-curvature difference is made larger in the first-refractive-portion-side region than that in the second-refractive-portion-side region from the fitting point FP, and a mean-curvature difference N41 was set positive.

The spectacle lens of the present invention is preferably configured such that a mean curvature at least in a direction in which a refractive power decreases from the fitting point FP in the above-mentioned direction is smaller than the mean curvature along the above-mentioned direction in the lens curved surface of the lens without prism.

In the present invention, since the mean curvature in the direction in which the refractive power decreases from the fitting point FP is made smaller than the mean curvature of the lens without prism, the too small prismatic effect occurring in the first refractive portion is canceled out, and the deviation of the visual line in the periphery is reduced.

In the conventional lens, it has been found that the mean value of the mean-curvature difference is smaller in the first-refractive-portion-side region than that in the second-refractive-portion-side region from the fitting point FP. This will cause a prismatic effect that is too small in the first refractive portion as compared with the prism added to the prism thinning lens, which is considered to cause a deviation of the visual line in both the left and right eyes.

(5) Further, in the lens of the Comparative Example in which the spherical refractive power S of the distance portion is negative or zero and the prism base direction of the prism provided at the prism measurement reference point O is set toward the distance portion side, a value of the mean-curvature difference is smaller than −0.02 (D) at the distance-power measurement position, and increases in the negative direction as approaching toward the lens periphery from the distance-power measurement position. This indicates that the mean curvature of the conventional lens with respect to the lens curved surface of the lens without prism is large. This will cause a prismatic effect that is too small in the first refractive portion as compared with the prism added to the prism thinning lens, which is considered to cause a deviation of the visual line in both the left and right eyes.

As shown in FIGS. 4 and 5, a spherical refractive power S of the distance portion was negative or zero, a prism base direction of a prism provided at the prism measurement reference point O was set toward the near-portion side, a value of the differences N21 and N31 of a mean curvature along the Y direction with respect to a mean curvature along the Y direction in a lens curved surface of a lens without prism was set to 0.02 (D) or less at the distance-power measurement position FM.

(6) As shown in FIGS. 7 and 8, a spherical refractive power S was negative or zero, a prism base direction of a prism provided at the prism measurement reference point O was set toward the distance portion side, and a value of a difference of a mean curvature along a line segment set from the distance portion to the near portion in a lens curved surface with respect to a mean curvature along the Y direction of a lens without prism was set to −0.02 (D) or more at the distance-power measurement position.

In the spectacle lens described above, since the mean-curvature difference is set differently from that in the Comparative Example, a deviation of the visual line in the periphery as in the Comparative Example is reduced, and the deviation of the visual line in both the left and right eyes is eliminated.

(7) As shown in FIGS. 10A and 10B, when a lens added with a prism corresponding to an amount if the prism thinning is defined as a prism thinning lens CL; a lens that has prescription values other than the prism all the same and is not added with a prism is defined as a reference lens BL; in the reference lens BL, the incident ray vectors L11A, L12A, and L13A in a case where a plurality of rays are incident on the reference lens BL such that a plurality of rays rotated by an angle γ corresponding to the prism are to exit and to be directed toward an eyeball rotation point E are defined as a target ray group; and respective rays emitted from a plurality of object points A1, A2, and A3 are incident on an incident surface LI of the prism thinning lens CL, and a plurality of rays directed toward an eyeball rotation point E among rays exiting from an exit surface LO of the prism thinning lens CL are defined as a prism ray group LCO of each line-of-sight direction of the prism thinning lens CL, an inclination of the exit surface LO is determined such that a plurality of ray vectors passing through a same position as any given point among rays constituting the prism ray group LCO become parallel to the target ray group. Since the ray exiting from the exit surface LO of the prism thinning lens CL and incident on an eyeball rotation point E is approximate to the ray exiting from the ideal reference lens BL added with no prism and incident on an eyeball rotation point E, an image is less likely to be seen shifted even when viewing through any position of the lens.

It has been found that, in the conventional lens, the mean-curvature difference increases in the positive direction as separating from the prism measurement reference point O in the first refractive portion. This indicates that the mean curvature of the conventional lens is small with respect to the lens curved surface of the lens without prism. Because the mean curvature is smaller than that of the lens without prism, a prism amount at a point away from the prism measurement reference point O in the direction of the first refractive portion is to become larger than a prism amount provided at the prism measurement reference point O. (Hereinafter, this state is referred to as a prism imbalance). This will cause a deviation of the visual line in viewing with both the left and right eyes. Therefore, in the present invention, considering that the prism amount becomes larger in the direction of the first refractive portion from the prism measurement reference point O than that at the prism measurement reference point O with respect to the provided prism amount, the difference with respect to the mean curvature in the lens curved surface of the lens without prism was increased. This is to eliminate the prism imbalance, and eliminate a deviation of the visual line between both the left and right eyes.

(8) Specifically, as shown in FIGS. 10A, 10B, and 11, the incident ray vectors L21A, L22A, and L23A of rays incident on the incident surface LI of the prism thinning lens CL and the exit ray vectors L21B, L22B, and L23B exiting from the exit surface LO are stored; the target ray group including the incident ray vectors L11A, L12A, and L13A is stored; a prismatic effect of the prism thinning lens CL before correction is calculated from the incident ray vectors L21A, L22A, and L23A and the exit ray vectors L21B, L22B, and L23B; each angle formed by a direction of an exit ray vector exiting from the reference lens BL and a direction of an exit ray vector exiting from the prism thinning lens CL is calculated, that is, a prismatic effect for obtaining an ideal exit ray in which each deviation angle becomes equal at the prism measurement reference point O1 and the lens peripheral portions O2 and O3 is calculated from the exit ray vector L21B, L22B, and L23B and the exit ray vectors L11B, L12B, and L13B; a correction prism amount for correcting a slope of the exit surface LO is calculated based on a difference between a pre-correction prismatic effect obtained by the calculation and the prismatic effect for obtaining an ideal exit ray; and the exit surface is corrected based on the correction prism amount obtained by the calculation. Therefore, by performing the above series of steps, it is possible to efficiently reduce the deviation of the visual lines of both the left and right eyes.

(9) As shown in FIG. 11, since determination is made as to whether or not the difference of prismatic effect is equal to or less than a target value after correction of the exit surface LO based on the calculated prism amount, the above-described process is repeated when the difference of the prismatic effect is not equal to or not less than a target value, so that it is possible to prevent a deviation of the visual lines of both the left and right eyes with high accuracy.

Furthermore, as shown in FIG. 11, since determination is made as to whether or not the correction is performed for a predetermined number of counts after correction of the inclined surface of the exit surface LO based on the calculated correction prism amount, correction of the exit surface LO is terminated when the correction has been repeated for a predetermined number of counts, which enables reduction of time for the design.

(10) As shown in FIG. 20, in order to produce a spectacle lens, since there are provided a spectacle lens designing step S201 of designing a spectacle lens and a processing step S203 of processing a spectacle lens designed in step S201 of designing a spectacle lens, and the spectacle lens designing step S201 is to implement the above-described configuration, it is possible to produce a spectacle lens with a less deviation of the visual lines of both the left and right eyes.

It should be noted that the present invention is not limited to the above-described embodiment, and the present invention includes variations, improvements, and the like within the scope of achieving the object of the present invention.

For example, in the designing method for a spectacle lens of the embodiment, the inclination of the exit surface LO of the prism thinning lens CL is corrected. However, in the present invention, an inclination of the incident surface LI of the prism thinning lens CL may be corrected. Here, the eyeball-side optical surface is the exit surface and is a surface on the eyeball side, and may be referred to as a rear surface or a concave surface. The object-side optical surface is the incident surface and is a surface on the object side, and may be referred to as a front surface or a convex surface.

In addition, while the first refractive portion is the distance portion and the second refractive portion is the near portion, it is also possible to use a lens (occupational lens) with a first refractive portion being suitable for viewing a middle distance, or a lens (near vision lens) with a first refractive portion and a second refractive portion being suitable for seeing near the hand of the wearer, in the present invention.

The present embodiment will be summarized with reference to the drawings.

[1] Description Will be Made with Reference to FIGS. 1, 3A, and 3B.

An embodiment of the present invention is a spectacle lens that includes: a first refractive portion (e.g., a distance portion F1) having a first refractive power; a second refractive portion (e.g., a near portion F2) having a second refractive power larger than the first refractive power; and a corridor F3 provided between the first refractive portion and the second refractive portion, and the spectacle lens is added with prism thinning. In the spectacle lens, a spherical refractive power of the first refractive portion is positive, and a prism base direction of a prism provided at a prism measurement reference point O (e.g., a geometric center O) is set toward the second refractive portion side; a mean value of a difference N11 of a mean curvature in a lens curved surface along a direction (Y direction) passing through a midpoint LM of a connecting line LC between two alignment reference marks M and orthogonal to the connecting line LC, with respect to a mean curvature in a lens curved surface along a direction (Y direction) of a lens without prism is smaller in the first-refractive-portion-side region from a fitting point FP than that in the second-refractive-portion-side region from the fitting point FP.

[2] Description Will be Made with Reference to FIGS. 1 and 2.

A further preferred embodiment of the present invention is a spectacle lens in which, in the above-mentioned spectacle lens, a mean curvature at least in a direction in which a refractive power decreases from the fitting point FP in the above-mentioned direction (Y direction) is smaller than a mean curvature in the lens curved surface along the direction (Y direction) of the lens without prism.

[3] Description Will be Made with Reference to FIGS. 5 and 4.

Another embodiment of the present invention is a spectacle lens that includes a distance portion F1, a near portion F2, and a corridor F3, and the spectacle lens is added with prism thinning. In the spectacle lens, a spherical refractive power of the distance portion F1 is negative or zero; a prism base direction of a prism provided at a prism measurement reference point O is set toward the near-portion side; and a value of differences N21 and N31 of a mean curvature in a lens curved surface along a direction (Y direction) passing through a midpoint of a connecting line LC between two alignment reference marks M and orthogonal to the connecting line LC, with respect to the mean curvature in the lens curved surface along a direction (Y direction) of a lens without prism, is 0.02 (D) or less at a distance-power measurement position FM.

[4] Description Will be Made with Reference to FIGS. 3A and 3B.

Yet another embodiment of the present invention is a spectacle lens that includes: a first refractive portion (e.g., a distance portion F1) having a first refractive power; a second refractive portion (e.g., a near portion F2) having a second refractive power larger than the first refractive power; and a corridor F3 provided between the first refractive portion and the second refractive portion, and the spectacle lens is added with prism thinning. In the spectacle lens, a spherical refractive power of the first refractive portion is positive; a prism base direction of a prism provided at a prism measurement reference point O (e.g., a geometric center O) is set toward the first refractive portion side; a mean value of a difference N41 of a mean curvature in a lens curved surface along a direction (Y direction) passing through a midpoint LM of a connecting line LC between two alignment reference marks M and orthogonal to the connecting line LC, with respect to a mean curvature in a lens curved surface along a direction (Y direction) of a lens without prism is larger in a first-refractive-portion-side region from a fitting point FP than that in a second refractive portion side region from the fitting point FP.

[5] Description Will be Made with Reference to FIG. 6.

A further preferred embodiment of the present invention is a spectacle lens in which, in the spectacle lens described above, a mean curvature at least in a direction in which a refractive power decreases from the fitting point FP in the above-mentioned direction (Y direction) is larger than the mean curvature along the direction (Y direction) in the lens curved surface of the lens without prism.

[6] Description Will be Made with Reference to FIGS. 7 and 8.

Yet another embodiment of the present invention is a spectacle lens that includes a distance portion F1, a near portion F2, and a corridor F3, and the spectacle lens is added with prism thinning. In the spectacle lens, a spherical refractive power of the distance portion F1 is negative or zero; a prism base direction of a prism provided at a prism measurement reference point O (e.g., a geometric center O) is set toward the distance portion side; and a value of differences N51 and N61 of a mean curvature in a lens curved surface along a direction passing through a midpoint LM of a connecting line LC between two alignment reference marks M and orthogonal to the connecting line LC, with respect to a mean curvature in a lens curved surface along a direction (Y direction) of a lens without prism is −0.02 (D) or more at a distance-power measurement position FM.

[7] Description Will be Made with Reference to FIGS. 9, 10A, and 10B.

Yet another embodiment of the present invention is a designing method for a spectacle lens that includes: a first refractive portion (e.g., a distance portion F1) having a first refractive power; a second refractive portion (e.g., a near portion F2) having a second refractive power larger than the first refractive power; and a corridor F3 provided between the first refractive portion and the second refractive portion, and the spectacle lens is added with prism thinning. The method for designing a spectacle lens includes a lens-surface-shape determination step. In a case where a lens added with a prism corresponding to an amount of the prism thinning is defined as a prism thinning lens CL; a lens that has prescription values other than the prism all the same and is not added with a prism is defined as a reference lens BL; in the reference lens BL, incident ray vectors L11A, L12A, and L13A in a case where a plurality of rays are incident on the reference lens such that a plurality of rays rotated by an angle γ corresponding to the prism are to exit and to be directed toward an eyeball rotation point are defined as a target ray group; and respective rays emitted from a plurality of object points A1, A2, and A3 are incident on an object-side optical surface (incident surface LI) of the prism thinning lens CL, and a plurality of rays directed toward an eyeball rotation point E among rays exiting from an eyeball-side optical surface (exit surface LO) of the prism thinning lens CL are defined as a prism ray group LCO of each line-of-sight direction of the prism thinning lens CL, the lens-surface-shape determination step determines an inclination of the object-side optical surface (incident surface LI) or the eyeball-side optical surface (exit surface LO) such that a plurality of ray vectors passing through a same position as any given point among rays constituting the prism ray group LCO become parallel to the target ray group.

[8] Description Will be Made with Reference to FIG. 11.

A further preferred embodiment of the present invention is a designing method for a spectacle lens in which, in the above-mentioned designing method for the spectacle lens, the lens-surface-shape determination step includes: a prism-thinning-lens vector storing step S1 of storing incident ray vectors L21A, L22A, and L23A of rays incident on the object-side optical surface (incident surface LI) of the prism thinning lens CL, and exit ray vectors L21B, L22B, and L23B exiting from the eyeball-side optical surface (exit surface LO); a target-ray-group storing step S2 of storing the target ray group; a pre-correction prismatic effect calculation step S3 of calculating a prismatic effect of the prism thinning lens CL before correction from the incident ray vectors L21A, L22A, and L23A and the exit ray vectors L21B, L22B, and L23B stored in the prism-thinning-lens vector storing step S1; an ideal prismatic effect calculation step S4 in which, from the incident ray vectors L21A, L22A, and L23A stored in the prism-thinning-lens vector storing step S1 and the target ray group stored in the target-ray-group storing step, each angle formed by a direction of an exit ray vector exiting from the reference lens BL and a direction of an exit ray vector exiting from the prism thinning lens CL becomes equal at any given point; a correction prism amount calculation step S5 of calculating a correction prism amount in order to correct a slope of the object-side optical surface (incident surface LI) or the eyeball-side optical surface (exit surface LO), based on a difference between a prismatic effect obtained in the pre-correction prismatic effect calculation step S3 and a prismatic effect obtained in the ideal prismatic effect calculation step S4; and a correction step S6 of correcting the object-side optical surface (incident surface LI) or the eyeball-side optical surface (exit surface LO) based on a correction prism amount obtained in the correction prism amount calculation step S5.

[9] Description Will be Made with Reference to FIG. 11.

A further preferred embodiment of the present invention is a designing method for a spectacle lens in which, in the above-mentioned designing method for the spectacle lens, the prism-thinning-lens vector storing step S1, the pre-correction prismatic effect calculation step S3, and the correction prism amount calculation step S5 are performed after the correction step S6; determination is made as to whether or not a difference of the prismatic effect is equal to or less than a target value or a predetermined number of corrections have been performed (S7); and the correction step S6 is terminated when a difference of the prismatic effect is equal to or less than a target value or a predetermined number of corrections have been performed.

[10] Description Will be Made with Reference to FIG. 11.

Yet another embodiment of the present invention is a producing method for a spectacle lens, and the producing method includes: a spectacle lens designing step S201; and a processing step S203 of processing a spectacle lens designed in step S201 of designing a spectacle lens. The spectacle lens designing step S201 is a step of designing a spectacle lens that includes: a first refractive portion (e.g., a distance portion F1) having a first refractive power; a second refractive portion (e.g., a near portion F2) having a second refractive power larger than the first refractive power; and a corridor F3 provided between the first refractive portion and the second refractive portion, and the spectacle lens is added with prism thinning. In the spectacle lens designing step S201, in a case where a lens added with a prism corresponding to an amount of the prism thinning is defined as a prism thinning lens CL; a lens that has prescription values other than the prism all the same and is not added with a prism is defined as a reference lens BL; in the reference lens BL, incident ray vectors L11A, L12A, and L13A in a case where a plurality of rays are incident on the reference lens such that a plurality of rays rotated by an angle γ corresponding to the prism are to exit and to be directed toward an eyeball rotation point are defined as a target ray group; and respective rays emitted from a plurality of object points A1, A2, and A3 are incident on an object-side optical surface (incident surface LI) of the prism thinning lens CL, and a plurality of rays directed toward an eyeball rotation point E among rays exiting from an eyeball-side optical surface (exit surface LO) of the prism thinning lens CL are defined as a prism ray group LCO of each line-of-sight direction of the prism thinning lens CL, an inclination of the object-side optical surface (incident surface LI) or the eyeball-side optical surface (exit surface LO) is determined such that a plurality of ray vectors passing through a same position as any given point among rays constituting the prism ray group LCO become parallel to the target ray group.

The invention claimed is:

1. A designing method for a spectacle lens comprising a first refractive portion having a first refractive power, a second refractive portion having a second refractive power larger than the first refractive power, and a corridor provided between the first refractive portion and the second refractive portion, the spectacle lens being added with prism thinning, the designing method comprising a lens-surface-shape determination step, wherein a prism thinning lens is a lens defined by adding a prism in a vertical direction corresponding to an amount of the prism thinning to a reference lens designed in accordance with a prescription value, the prism thinning lens comprising minimum edge thicknesses of an upper end and a lower end, among rays that are emitted from a plurality of object points, are incident on an object-side optical surface of the reference lens and exit from an eyeball-side optical surface of the reference lens, rays that are obtained by rotating a plurality of rays directed toward an eyeball rotation point around the eyeball rotation point by an angle corresponding to a prism amount of the prism thinning applied at a prism measurement reference point of the reference lens and respectively comprise incident ray vectors incident on the object-side optical surface and exit ray vectors exiting from the eyeball-side optical surface are defined as a target ray group, and among rays that are emitted from the plurality of object points, are incident on an object-side optical surface of the prism thinning lens; and exit from an eyeball-side optical surface of the prism thinning lens, rays that are directed toward the eyeball rotation point and respectively comprise incident ray vectors incident on the object-side optical surface and exit ray vectors exiting from the eyeball-side optical surface are defined as a prism ray group, the method comprising:
- a prism-thinning-lens vector storing step of storing the prism ray group;
- a target-ray-group storing step of storing the target ray group;
- a pre-correction prismatic effect calculation step of calculating a prismatic effect of the prism thinning lens before correction from the prism ray group stored in the prism-thinning-lens vector storing step;
- an ideal prismatic effect calculation step of calculating an ideal prismatic effect in which angles respectively formed by directions of the exit ray vectors exiting from the reference lens and directions of the exit ray vectors exiting from the prism thinning lens are at minimum at any given point, from the exit ray vectors of the prism ray group stored in the prism-thinning-lens vector storing step and the exit ray vectors of the target ray group stored in the target-ray-group storing step;
- a correction prism amount calculation step of calculating a correction prism amount to correct a slope of the eyeball-side optical surface of the prism thinning lens based on a difference between the prismatic effect obtained in the pre-correction prismatic effect calculation step and the prismatic effect obtained in the ideal prismatic effect calculation step; and
- a correction step of correcting the eyeball-side optical surface based on the correction prism amount obtained in the correction prism amount calculation step.

2. The designing method for the spectacle lens according to claim 1, wherein
after the correction step, the prism-thinning-lens vector storing step, the pre-correction prismatic effect calculation step, and the correction prism amount calculation step are performed; determination is made as to whether or not a difference of the prismatic effect is equal to or less than a target value, or a predetermined number of corrections have been performed; and the correction step is terminated when a difference of the prismatic effect is equal to or less than a target value, or a predetermined number of corrections have been performed.

3. A producing method for a spectacle lens, the producing method comprising: a spectacle lens designing step; and a processing step of processing a spectacle lens designed in the spectacle lens designing step, wherein
the spectacle lens designing step is a step of designing a spectacle lens comprising a first refractive portion having a first refractive power, a second refractive portion having a second refractive power larger than the first refractive power, and a corridor provided between the first refractive portion and the second refractive portion, the spectacle lens being added with prism thinning, a prism thinning lens is defined by adding a prism in a vertical direction corresponding to an amount of the prism thinning to a reference lens designed in accordance with a prescription value, the prism thinning lens comprising minimum edge thicknesses of an upper end and a lower end, among rays that are emitted from a plurality of object points, are incident on an object-side optical surface of the reference lens and exit from an eyeball-side optical surface of the reference lens, rays that are obtained by rotating a plurality of rays directed toward an eyeball rotation point around the eyeball rotation point by an angle corresponding to a prism amount of the prism thinning applied at a prism measurement reference point of the reference lens and respectively comprise incident ray vectors incident on the object-side optical surface and exit ray vectors exiting from the eyeball-side optical surface are defined as a target ray group, and among rays that are emitted from the plurality of object points, are incident on an object-side optical surface of the prism thinning lens and exit from an eyeball-side optical surface of the prism thinning lens, rays that are directed toward the eyeball rotation point and respectively comprise incident ray vectors incident on the object-side optical surface and exit ray vectors exiting from the eyeball-side optical surface are defined as a prism ray group, the method comprising:
- a prism-thinning-lens vector storing step of storing the prism ray group;
- a target-ray-group storing step of storing the target ray group;
- a pre-correction prismatic effect calculation step of calculating a prismatic effect of the prism thinning lens before correction from the prism ray group stored in the prism-thinning-lens vector storing step;
- an ideal prismatic effect calculation step of calculating an ideal prismatic effect in which angles respectively formed by directions of the exit ray vectors exiting from the reference lens and directions of the exit ray vectors exiting from the prism thinning lens are at minimum at any given point, from the exit ray vectors of the prism ray group stored in the prism-thinning-lens vector storing step and the exit ray vectors of the target ray group stored in the target-ray-group storing step;
- a correction prism amount calculation step of calculating a correction prism amount to correct a slope of the eyeball-side optical surface of the prism thinning lens based on a difference between the prismatic effect obtained in the pre-correction prismatic effect calculation step and the prismatic effect obtained in the ideal prismatic effect calculation step; and
- a correction step of correcting the eyeball-side optical surface based on the correction prism amount obtained in the correction prism amount calculation step.

* * * * *